(12) United States Patent
Isaacs et al.

(10) Patent No.: US 8,489,878 B2
(45) Date of Patent: *Jul. 16, 2013

(54) COMMUNICATION ACROSS DOMAINS

(75) Inventors: Scott Isaacs, Sammamish, WA (US);
George Moore, Issaquah, WA (US);
Danny Thorpe, Ben Lomond, CA (US);
Vasileios Zissimopoulos, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/419,215

(22) Filed: Mar. 13, 2012

(65) Prior Publication Data
US 2012/0173868 A1   Jul. 5, 2012

Related U.S. Application Data

(63) Continuation of application No. 11/805,088, filed on May 22, 2007, now Pat. No. 8,185,737, which is a continuation-in-part of application No. 11/426,174, filed on Jun. 23, 2006, now Pat. No. 8,250,082.

(51) Int. Cl.
*H04L 9/32* (2006.01)

(52) U.S. Cl.
USPC ........... 713/168; 713/169; 713/170; 713/171; 713/172; 726/3; 726/4; 726/5; 726/6; 726/7

(58) Field of Classification Search
USPC ........................................................ 713/168
See application file for complete search history.

(56) References Cited

U.S. PATENT DOCUMENTS

| | | | |
|---|---|---|---|
| 4,227,253 A | 10/1980 | Ehrsam et al. |
| 4,984,272 A | 1/1991 | McIlroy et al. |
| 5,210,874 A | 5/1993 | Karger |
| 5,339,422 A | 8/1994 | Brender et al. |
| 5,377,188 A | 12/1994 | Seki |
| 5,428,529 A | 6/1995 | Hartrick et al. |
| 5,623,604 A | 4/1997 | Russell et al. |
| 5,659,539 A | 8/1997 | Porter et al. |
| 5,666,519 A | 9/1997 | Hayden |
| 5,675,762 A | 10/1997 | Bodin et al. |
| 5,729,710 A | 3/1998 | Magee et al. |
| 5,758,093 A | 5/1998 | Boezeman et al. |

(Continued)

FOREIGN PATENT DOCUMENTS

| CN | 1299478 | 6/2001 |
|---|---|---|
| CN | 1366239 | 8/2002 |

(Continued)

OTHER PUBLICATIONS

"Corrected Notice of Allowance", U.S. Appl. No. 13/419,254, (Sep. 28, 2012), 2 pages.

(Continued)

*Primary Examiner* — Longbit Chai
(74) *Attorney, Agent, or Firm* — Wolfe-SBMC

(57) ABSTRACT

Communication across domains is described. In at least one implementation, a determination is made that an amount of data to be communicated via an Iframe exceeds a threshold amount. The data is divided into a plurality of portions that do not exceed the threshold amount. A plurality of messages is formed to communicate the divided data across domains.

20 Claims, 11 Drawing Sheets

U.S. PATENT DOCUMENTS

| | | | |
|---|---|---|---|
| 5,760,767 A | 6/1998 | Shore et al. |
| 5,771,383 A | 6/1998 | Magee et al. |
| 5,799,090 A | 8/1998 | Angert |
| 5,812,394 A | 9/1998 | Lewis et al. |
| 5,852,435 A | 12/1998 | Vigneaux et al. |
| 5,892,904 A | 4/1999 | Atkinson et al. |
| 5,931,900 A | 8/1999 | Notani et al. |
| 5,941,947 A | 8/1999 | Brown et al. |
| 5,949,882 A | 9/1999 | Angelo |
| 5,974,549 A | 10/1999 | Golan |
| 5,983,348 A | 11/1999 | Ji |
| 5,987,523 A | 11/1999 | Hind et al. |
| 5,987,611 A | 11/1999 | Freund |
| 5,995,945 A | 11/1999 | Notani et al. |
| 6,006,228 A | 12/1999 | McCollum et al. |
| 6,029,245 A | 2/2000 | Scanlan |
| 6,041,309 A | 3/2000 | Laor |
| 6,076,109 A | 6/2000 | Kikinis |
| 6,092,194 A | 7/2000 | Touboul |
| 6,154,844 A | 11/2000 | Touboul et al. |
| 6,158,007 A | 12/2000 | Moreh et al. |
| 6,161,139 A | 12/2000 | Win et al. |
| 6,211,877 B1 | 4/2001 | Steele et al. |
| 6,253,326 B1 | 6/2001 | Lincke et al. |
| 6,266,681 B1 | 7/2001 | Guthrie |
| 6,272,641 B1 | 8/2001 | Ji |
| 6,275,937 B1 | 8/2001 | Hailpern et al. |
| 6,275,938 B1 | 8/2001 | Bond et al. |
| 6,279,111 B1 | 8/2001 | Jensenworth et al. |
| 6,311,269 B2 | 10/2001 | Luckenbaugh et al. |
| 6,317,868 B1 | 11/2001 | Grimm et al. |
| 6,321,334 B1 | 11/2001 | Jerger et al. |
| 6,332,147 B1 | 12/2001 | Moran et al. |
| 6,339,423 B1 | 1/2002 | Sampson et al. |
| 6,343,362 B1 | 1/2002 | Ptacek et al. |
| 6,345,361 B1 | 2/2002 | Jerger et al. |
| 6,351,816 B1 | 2/2002 | Mueller et al. |
| 6,366,912 B1 | 4/2002 | Wallent et al. |
| 6,385,301 B1 | 5/2002 | Nolting et al. |
| 6,430,561 B1 | 8/2002 | Austel et al. |
| 6,457,130 B2 | 9/2002 | Hitz et al. |
| 6,460,079 B1 | 10/2002 | Blumenau |
| 6,473,800 B1 | 10/2002 | Jerger et al. |
| 6,490,626 B1 | 12/2002 | Edwards et al. |
| 6,516,308 B1 | 2/2003 | Cohen |
| 6,519,647 B1 | 2/2003 | Howard et al. |
| 6,526,513 B1 | 2/2003 | Shrader et al. |
| 6,546,546 B1 | 4/2003 | Van Doorn |
| 6,553,393 B1 | 4/2003 | Eilbott et al. |
| 6,553,410 B2 | 4/2003 | Kikinis |
| 6,584,186 B1 | 6/2003 | Aravamudan et al. |
| 6,591,265 B1 | 7/2003 | Erickson et al. |
| 6,594,664 B1 | 7/2003 | Estrada et al. |
| 6,598,046 B1 | 7/2003 | Goldberg et al. |
| 6,601,233 B1 | 7/2003 | Underwood |
| 6,609,198 B1 | 8/2003 | Wood et al. |
| 6,629,081 B1 | 9/2003 | Cornelius et al. |
| 6,629,246 B1 | 9/2003 | Gadi |
| 6,636,889 B1 | 10/2003 | Estrada et al. |
| 6,636,972 B1 | 10/2003 | Ptacek et al. |
| 6,662,341 B1 | 12/2003 | Cooper et al. |
| 6,671,802 B1 | 12/2003 | Ott |
| 6,691,153 B1 | 2/2004 | Hanson et al. |
| 6,691,230 B1 | 2/2004 | Bardon |
| 6,701,376 B1 | 3/2004 | Haverstock et al. |
| 6,711,675 B1 | 3/2004 | Spiegel et al. |
| 6,724,406 B1 | 4/2004 | Kelley |
| 6,728,762 B1 | 4/2004 | Estrada et al. |
| 6,748,425 B1 | 6/2004 | Duffy et al. |
| 6,754,702 B1 | 6/2004 | Kennelly et al. |
| 6,772,167 B1 | 8/2004 | Snavely et al. |
| 6,772,345 B1 | 8/2004 | Shett |
| 6,772,393 B1 | 8/2004 | Estrada et al. |
| 6,779,120 B1 | 8/2004 | Valente |
| 6,785,790 B1 | 8/2004 | Christie et al. |
| 6,789,170 B1 | 9/2004 | Jacobs et al. |
| 6,789,204 B2 | 9/2004 | Abdelnur et al. |
| 6,792,113 B1 | 9/2004 | Ansell et al. |
| 6,799,208 B1 | 9/2004 | Sankaranarayan et al. |
| 6,801,224 B1 | 10/2004 | Lewallen et al. |
| 6,820,261 B1 | 11/2004 | Bloch |
| 6,823,433 B1 | 11/2004 | Barnes et al. |
| 6,826,716 B2 | 11/2004 | Mason |
| 6,850,252 B1 | 2/2005 | Hoffberg |
| 6,854,039 B1 | 2/2005 | Strongin et al. |
| 6,862,488 B2 | 3/2005 | Mansour-Awad |
| 6,871,321 B2 | 3/2005 | Wakayama |
| 6,898,618 B1 | 5/2005 | Slaughter et al. |
| 6,898,705 B2 | 5/2005 | Abboud et al. |
| 6,915,454 B1 | 7/2005 | Moore et al. |
| 6,920,560 B2 | 7/2005 | Wallace et al. |
| 6,931,532 B1 | 8/2005 | Davis et al. |
| 6,934,757 B1 | 8/2005 | Kalantar et al. |
| 6,941,459 B1 | 9/2005 | Hind et al. |
| 6,959,336 B2 | 10/2005 | Moreh et al. |
| 6,961,849 B1 | 11/2005 | Davis et al. |
| 6,978,367 B1 | 12/2005 | Hind et al. |
| 7,003,734 B1 | 2/2006 | Gardner et al. |
| 7,010,681 B1 | 3/2006 | Fletcher et al. |
| 7,051,366 B1 | 5/2006 | LaMacchia et al. |
| 7,051,368 B1 | 5/2006 | Howard et al. |
| 7,069,554 B1 | 6/2006 | Stammers et al. |
| 7,082,527 B2 | 7/2006 | Zimmer et al. |
| 7,082,572 B2 | 7/2006 | Pea et al. |
| 7,085,995 B2 | 8/2006 | Fukuda et al. |
| 7,093,244 B2 | 8/2006 | Lajoie et al. |
| 7,117,504 B2 | 10/2006 | Smith et al. |
| 7,143,362 B2 | 11/2006 | Dieberger et al. |
| 7,155,737 B1 | 12/2006 | Lim et al. |
| 7,159,237 B2 | 1/2007 | Schneier et al. |
| 7,185,210 B1 | 2/2007 | Faden |
| 7,188,363 B1 | 3/2007 | Boutros et al. |
| 7,191,252 B2 | 3/2007 | Redlich et al. |
| 7,194,744 B2 | 3/2007 | Srivastava et al. |
| 7,203,749 B2 | 4/2007 | Hiraga |
| 7,213,051 B2 | 5/2007 | Zhu et al. |
| 7,240,015 B1 | 7/2007 | Karmouch et al. |
| 7,263,561 B1 | 8/2007 | Green et al. |
| 7,275,152 B2 | 9/2007 | Goud et al. |
| 7,281,132 B2 | 10/2007 | Bender et al. |
| 7,308,648 B1 | 12/2007 | Buchthal et al. |
| 7,318,238 B1 | 1/2008 | Elvanoglu et al. |
| 7,328,435 B2 | 2/2008 | Trifon |
| 7,343,626 B1 | 3/2008 | Gallagher |
| 7,392,545 B1 | 6/2008 | Weber et al. |
| 7,398,533 B1 | 7/2008 | Slaughter et al. |
| 7,406,502 B1 | 7/2008 | Oliver et al. |
| 7,451,352 B1 | 11/2008 | Moore et al. |
| 7,475,404 B2 | 1/2009 | Hamel |
| 7,478,434 B1 | 1/2009 | Hinton et al. |
| 7,480,907 B1 | 1/2009 | Marolia et al. |
| 7,484,247 B2 | 1/2009 | Rozman et al. |
| 7,562,382 B2 | 7/2009 | Hinton et al. |
| 7,600,224 B2 | 10/2009 | Obayashi et al. |
| 7,620,719 B2 | 11/2009 | Tock et al. |
| 7,640,434 B2 | 12/2009 | Lee et al. |
| 7,650,617 B2 | 1/2010 | Hoshino et al. |
| 7,650,638 B1 | 1/2010 | Njemanze et al. |
| 7,660,868 B1 | 2/2010 | Kembel et al. |
| 7,729,992 B2 | 6/2010 | Rose |
| 7,792,964 B2 | 9/2010 | Franco |
| 7,904,278 B2 | 3/2011 | Wilson et al. |
| 8,078,740 B2 | 12/2011 | Franco |
| 8,185,737 B2 | 5/2012 | Isaacs |
| 8,335,929 B2 | 12/2012 | Isaacs |
| 2001/0013096 A1 | 8/2001 | Luckenbaugh et al. |
| 2001/0016907 A1 | 8/2001 | Kang et al. |
| 2001/0039622 A1 | 11/2001 | Hitz et al. |
| 2001/0043237 A1 | 11/2001 | Schmieder |
| 2001/0049671 A1 | 12/2001 | Joerg |
| 2001/0054049 A1 | 12/2001 | Maeda et al. |
| 2002/0010679 A1 | 1/2002 | Felsher |
| 2002/0010855 A1 | 1/2002 | Reshef et al. |
| 2002/0019936 A1 | 2/2002 | Hitz et al. |
| 2002/0019941 A1 | 2/2002 | Chan et al. |
| 2002/0046290 A1 | 4/2002 | Andersson et al. |
| 2002/0054126 A1 | 5/2002 | Gamon |

| | | |
|---|---|---|
| 2002/0069200 A1 | 6/2002 | Cooper et al. |
| 2002/0073119 A1 | 6/2002 | Richard |
| 2002/0073197 A1 | 6/2002 | Bhogal et al. |
| 2002/0087479 A1 | 7/2002 | Malcolm |
| 2002/0099952 A1 | 7/2002 | Lambert et al. |
| 2002/0104023 A1 | 8/2002 | Hewett et al. |
| 2002/0107889 A1 | 8/2002 | Stone et al. |
| 2002/0107890 A1 | 8/2002 | Gao et al. |
| 2002/0112155 A1 | 8/2002 | Martherus et al. |
| 2002/0124181 A1 | 9/2002 | Nambu |
| 2002/0129239 A1 | 9/2002 | Clark |
| 2002/0147923 A1 | 10/2002 | Dotan |
| 2002/0166052 A1 | 11/2002 | Garg et al. |
| 2002/0178375 A1 | 11/2002 | Whittaker et al. |
| 2002/0184520 A1 | 12/2002 | Bush et al. |
| 2002/0188527 A1 | 12/2002 | Dillard et al. |
| 2002/0188689 A1 | 12/2002 | Michael |
| 2002/0188869 A1 | 12/2002 | Patrick |
| 2003/0002526 A1 | 1/2003 | Dias et al. |
| 2003/0014659 A1 | 1/2003 | Zhu |
| 2003/0023445 A1 | 1/2003 | Trifon |
| 2003/0023774 A1 | 1/2003 | Gladstone et al. |
| 2003/0023880 A1 | 1/2003 | Edwards et al. |
| 2003/0025727 A1 | 2/2003 | Rath et al. |
| 2003/0037236 A1 | 2/2003 | Simon et al. |
| 2003/0037261 A1 | 2/2003 | Meffert et al. |
| 2003/0051027 A1 | 3/2003 | Aupperle et al. |
| 2003/0051142 A1 | 3/2003 | Hidalgo et al. |
| 2003/0061482 A1 | 3/2003 | Emmerichs |
| 2003/0061512 A1 | 3/2003 | Flurry et al. |
| 2003/0078949 A1 | 4/2003 | Scholz et al. |
| 2003/0088807 A1 | 5/2003 | Mathiske et al. |
| 2003/0093464 A1 | 5/2003 | Clough et al. |
| 2003/0093666 A1 | 5/2003 | Millen et al. |
| 2003/0097591 A1 | 5/2003 | Pham et al. |
| 2003/0135504 A1* | 7/2003 | Elvanoglu et al. ............ 707/100 |
| 2003/0163448 A1 | 8/2003 | Kilemba et al. |
| 2003/0172293 A1 | 9/2003 | Johnson et al. |
| 2003/0177226 A1 | 9/2003 | Garg et al. |
| 2003/0177389 A1 | 9/2003 | Albert et al. |
| 2003/0177390 A1 | 9/2003 | Radhakrishnan |
| 2003/0229501 A1 | 12/2003 | Copeland et al. |
| 2004/0006706 A1 | 1/2004 | Erlingsson |
| 2004/0025060 A1 | 2/2004 | Raffaele et al. |
| 2004/0030788 A1 | 2/2004 | Cimo et al. |
| 2004/0034794 A1 | 2/2004 | Mayer et al. |
| 2004/0039752 A1 | 2/2004 | Goldfuss et al. |
| 2004/0047347 A1 | 3/2004 | Worry et al. |
| 2004/0054791 A1 | 3/2004 | Chakraborty et al. |
| 2004/0073811 A1 | 4/2004 | Sanin |
| 2004/0078577 A1 | 4/2004 | Feng et al. |
| 2004/0078591 A1 | 4/2004 | Teixeira et al. |
| 2004/0103200 A1 | 5/2004 | Ross et al. |
| 2004/0103203 A1 | 5/2004 | Nichols et al. |
| 2004/0109410 A1 | 6/2004 | Chase et al. |
| 2004/0123137 A1 | 6/2004 | Yodaiken |
| 2004/0123157 A1 | 6/2004 | Alagna et al. |
| 2004/0151323 A1 | 8/2004 | Olkin et al. |
| 2004/0167964 A1 | 8/2004 | Rounthwaite et al. |
| 2004/0187031 A1 | 9/2004 | Liddle |
| 2004/0199603 A1 | 10/2004 | Tafla et al. |
| 2004/0199763 A1 | 10/2004 | Freund |
| 2004/0205342 A1 | 10/2004 | Roegner |
| 2004/0210536 A1* | 10/2004 | Gudelj et al. ................. 705/64 |
| 2004/0215731 A1 | 10/2004 | Tzann-en Szeto |
| 2004/0230825 A1 | 11/2004 | Shepherd et al. |
| 2004/0239700 A1 | 12/2004 | Baschy |
| 2004/0239703 A1 | 12/2004 | Angelica |
| 2004/0254812 A1 | 12/2004 | Horstemeyer et al. |
| 2004/0260754 A1 | 12/2004 | Olson et al. |
| 2004/0268139 A1 | 12/2004 | Christianson et al. |
| 2004/0268322 A1 | 12/2004 | Chow et al. |
| 2005/0015752 A1 | 1/2005 | Alpern et al. |
| 2005/0021791 A1 | 1/2005 | Sakiyama et al. |
| 2005/0022012 A1 | 1/2005 | Bluestone et al. |
| 2005/0055458 A1 | 3/2005 | Mohan et al. |
| 2005/0055570 A1 | 3/2005 | Kwan et al. |
| 2005/0066290 A1 | 3/2005 | Chebolu et al. |
| 2005/0066311 A1 | 3/2005 | Hagmeier et al. |
| 2005/0071616 A1 | 3/2005 | Zimmer et al. |
| 2005/0091536 A1 | 4/2005 | Whitmer et al. |
| 2005/0108517 A1 | 5/2005 | Dillon et al. |
| 2005/0108518 A1 | 5/2005 | Pandya |
| 2005/0108554 A1 | 5/2005 | Rubin et al. |
| 2005/0114430 A1 | 5/2005 | Zheng et al. |
| 2005/0120242 A1 | 6/2005 | Mayer et al. |
| 2005/0149726 A1 | 7/2005 | Joshi et al. |
| 2005/0154885 A1 | 7/2005 | Viscomi et al. |
| 2005/0177635 A1 | 8/2005 | Schmidt et al. |
| 2005/0182924 A1 | 8/2005 | Sauve et al. |
| 2005/0182928 A1 | 8/2005 | Kamalanathan et al. |
| 2005/0193329 A1 | 9/2005 | Kickel |
| 2005/0198153 A1 | 9/2005 | Keohane et al. |
| 2005/0198332 A1 | 9/2005 | Laertz et al. |
| 2005/0204041 A1 | 9/2005 | Blinn et al. |
| 2005/0216582 A1 | 9/2005 | Toomey et al. |
| 2005/0222902 A1 | 10/2005 | Coit et al. |
| 2005/0223412 A1 | 10/2005 | Nadalin et al. |
| 2005/0223413 A1 | 10/2005 | Duggan et al. |
| 2005/0235200 A1 | 10/2005 | Goldberg |
| 2005/0256924 A1 | 11/2005 | Chory et al. |
| 2005/0259655 A1 | 11/2005 | Cuervo et al. |
| 2005/0259674 A1 | 11/2005 | Cuervo et al. |
| 2005/0262181 A1 | 11/2005 | Schmidt et al. |
| 2005/0262232 A1 | 11/2005 | Cuervo et al. |
| 2005/0262493 A1 | 11/2005 | Schmidt et al. |
| 2005/0267870 A1 | 12/2005 | Everett-Church et al. |
| 2005/0268214 A1 | 12/2005 | Lu |
| 2005/0283719 A1 | 12/2005 | Awamoto et al. |
| 2005/0283828 A1 | 12/2005 | Perley et al. |
| 2006/0010134 A1 | 1/2006 | Davis |
| 2006/0015728 A1 | 1/2006 | Ballinger et al. |
| 2006/0020538 A1 | 1/2006 | Ram et al. |
| 2006/0020679 A1 | 1/2006 | Hinton et al. |
| 2006/0026667 A1 | 2/2006 | Bhide |
| 2006/0031347 A1 | 2/2006 | Sahi |
| 2006/0031404 A1 | 2/2006 | Kassab |
| 2006/0036746 A1 | 2/2006 | Davis |
| 2006/0041636 A1 | 2/2006 | Ballinger et al. |
| 2006/0041834 A1 | 2/2006 | Chen et al. |
| 2006/0047959 A1 | 3/2006 | Morais |
| 2006/0053048 A1 | 3/2006 | Tandetnik |
| 2006/0053224 A1 | 3/2006 | Subramaniam |
| 2006/0053411 A1 | 3/2006 | Takamiya et al. |
| 2006/0056431 A1 | 3/2006 | Toyoda et al. |
| 2006/0069613 A1 | 3/2006 | Marquardt |
| 2006/0069737 A1 | 3/2006 | Gilhuly et al. |
| 2006/0123244 A1 | 6/2006 | Gheorghescu et al. |
| 2006/0136590 A1 | 6/2006 | Barrett et al. |
| 2006/0143688 A1 | 6/2006 | Futoransky |
| 2006/0150256 A1 | 7/2006 | Fanton et al. |
| 2006/0155780 A1 | 7/2006 | Sakairi et al. |
| 2006/0185021 A1 | 8/2006 | Dujari et al. |
| 2006/0259955 A1 | 11/2006 | Gunther et al. |
| 2006/0271425 A1 | 11/2006 | Goodman et al. |
| 2006/0277218 A1 | 12/2006 | Franco et al. |
| 2006/0277592 A1 | 12/2006 | Brown et al. |
| 2006/0277605 A1 | 12/2006 | Curtis et al. |
| 2007/0011744 A1 | 1/2007 | Carothers et al. |
| 2007/0016948 A1 | 1/2007 | Dubrovsky et al. |
| 2007/0016949 A1 | 1/2007 | Dunagan et al. |
| 2007/0016954 A1 | 1/2007 | Choi |
| 2007/0027779 A1 | 2/2007 | Bhambri et al. |
| 2007/0028185 A1 | 2/2007 | Bhogal et al. |
| 2007/0050854 A1 | 3/2007 | Cooperstein et al. |
| 2007/0056019 A1 | 3/2007 | Allen et al. |
| 2007/0073800 A1 | 3/2007 | Rothman et al. |
| 2007/0094712 A1 | 4/2007 | Gibbs et al. |
| 2007/0100915 A1 | 5/2007 | Rose |
| 2007/0101258 A1 | 5/2007 | Xu et al. |
| 2007/0101435 A1 | 5/2007 | Konanka et al. |
| 2007/0106650 A1 | 5/2007 | Moore |
| 2007/0107057 A1 | 5/2007 | Chander et al. |
| 2007/0113237 A1 | 5/2007 | Hickson |
| 2007/0113282 A1 | 5/2007 | Ross |
| 2007/0124693 A1 | 5/2007 | Dominowska et al. |
| 2007/0124797 A1 | 5/2007 | Gupta et al. |
| 2007/0136579 A1 | 6/2007 | Levy et al. |

| | | | |
|---|---|---|---|
| 2007/0136811 | A1 | 6/2007 | Gruzman et al. |
| 2007/0146812 | A1 | 6/2007 | Lawton |
| 2007/0174419 | A1 | 7/2007 | O'Connell et al. |
| 2007/0180147 | A1 | 8/2007 | Leigh |
| 2007/0180490 | A1 | 8/2007 | Renzi et al. |
| 2007/0192839 | A1 | 8/2007 | Fee et al. |
| 2007/0199000 | A1 | 8/2007 | Shekhel et al. |
| 2007/0199011 | A1 | 8/2007 | Zhang et al. |
| 2007/0199050 | A1 | 8/2007 | Meier |
| 2007/0204223 | A1 | 8/2007 | Bartels et al. |
| 2007/0208822 | A1 | 9/2007 | Wang et al. |
| 2007/0214503 | A1 | 9/2007 | Shulman et al. |
| 2007/0245310 | A1 | 10/2007 | Rosenstein et al. |
| 2007/0256003 | A1 | 11/2007 | Wagoner et al. |
| 2007/0260495 | A1 | 11/2007 | Mace et al. |
| 2007/0261037 | A1 | 11/2007 | Bendapudi |
| 2007/0271342 | A1 | 11/2007 | Brandt et al. |
| 2007/0282863 | A1 | 12/2007 | Schacher et al. |
| 2007/0294332 | A1 | 12/2007 | Karki et al. |
| 2007/0299857 | A1 | 12/2007 | Gwozdz et al. |
| 2007/0300064 | A1 | 12/2007 | Isaacs et al. |
| 2008/0005282 | A1 | 1/2008 | Gaedcke |
| 2008/0010615 | A1 | 1/2008 | Curtis et al. |
| 2008/0046518 | A1 | 2/2008 | Tonnison et al. |
| 2008/0046562 | A1 | 2/2008 | Butler |
| 2008/0195575 | A1 | 8/2008 | Schiffler |
| 2008/0262913 | A1 | 10/2008 | Reitz et al. |
| 2008/0263566 | A1 | 10/2008 | Buerge et al. |
| 2008/0288885 | A1 | 11/2008 | Ide et al. |
| 2008/0294716 | A1 | 11/2008 | Couvreur |
| 2008/0301643 | A1 | 12/2008 | Appleton et al. |
| 2008/0313648 | A1 | 12/2008 | Wang et al. |
| 2009/0006996 | A1 | 1/2009 | Saha et al. |
| 2009/0037517 | A1 | 2/2009 | Frei |
| 2009/0037806 | A1 | 2/2009 | Yang et al. |
| 2009/0043739 | A1 | 2/2009 | Choi |
| 2009/0070872 | A1 | 3/2009 | Cowings et al. |
| 2009/0083714 | A1 | 3/2009 | Kiciman et al. |
| 2009/0132713 | A1 | 5/2009 | Dutta et al. |
| 2009/0138937 | A1 | 5/2009 | Erlingsson et al. |
| 2009/0183171 | A1 | 7/2009 | Isaacs et al. |
| 2009/0183227 | A1 | 7/2009 | Isaacs et al. |
| 2009/0187918 | A1 | 7/2009 | Chen et al. |
| 2009/0254898 | A1 | 10/2009 | Sareen et al. |
| 2009/0265760 | A1 | 10/2009 | Zhu et al. |
| 2009/0276835 | A1 | 11/2009 | Jackson et al. |
| 2009/0299862 | A1 | 12/2009 | Fan et al. |
| 2009/0300496 | A1 | 12/2009 | Fan et al. |
| 2009/0327869 | A1 | 12/2009 | Fan et al. |
| 2009/0327896 | A1 | 12/2009 | Pall et al. |
| 2010/0058293 | A1 | 3/2010 | Dunagan |
| 2011/0106948 | A1 | 5/2011 | Franco |
| 2012/0173756 | A1 | 7/2012 | Isaacs |

FOREIGN PATENT DOCUMENTS

| | | |
|---|---|---|
| EP | 1420562 | 5/2004 |
| HK | 1119321 | 2/2009 |
| JP | 11167487 | 6/1999 |
| JP | 2001325249 | 11/2001 |
| JP | 2002290900 | 10/2002 |
| JP | 2004318816 | 11/2004 |
| KR | 20070102859 | 10/2007 |
| WO | WO-0153965 | 7/2001 |
| WO | WO-0213026 | 2/2002 |
| WO | WO-0219076 | 3/2002 |
| WO | WO-0239237 | 5/2002 |
| WO | WO-03073240 | 9/2003 |
| WO | WO-2004077294 | 9/2004 |
| WO | WO-2005008456 | 1/2005 |
| WO | WO-2005059755 | 6/2005 |
| WO | WO-2008002456 | 1/2008 |
| WO | WO-2008036969 | 3/2008 |

OTHER PUBLICATIONS

"Notice of Allowance", U.S. Appl. No. 13/419,254, (Aug. 9, 2012), 8 pages.

"About URL Security Zones", Available at http://msdn.microsoft.com/en-us/library/ms537183%28VS.85%29.aspx, (Jan. 23, 2008), 10 pages.

"Access Management and Single Sign-On for Web and J2EE Environments", Available at http://www.entegrity.com/products/aa/aa.shtml, (Feb. 6, 2005), 1 pages.

"Ad Blocking Resources", Retrieved from <<https://netfiles.uiuc.edu/ehowes/www/resource.htm>> on Aug. 17, 2005, (Jul. 17, 2005), 20 pages.

"Advisory Action", U.S. Appl. No. 11/426,785, Informed in an email dated Oct. 6, 2010 that this case is related.,(May 26, 2010),3 pages.

"Appeal Decision", U.S. Appl. No. 12/118,333, (Jun. 8, 2011), 2 pages.

"Bindings and Profiles for the OASIS Security Assertion Markup Language (SAML)", *Version 1.1*, Retrieved from http://www.oasis-open.org/committees/download.php/3405/oasis-sstc-saml-bindings-1.1.pdf, (Sep. 2, 2003), 31 pages.

"Block JavaScript, VBScript, and/or Embedded Objects", *MalekTips*, last accessed on Oct. 20, 2008, available at http://malektips.com/zonealarm_pro_0008.html, 1 page.

"BPAI Decision", U.S. Appl. No. 10/606,089, (Aug. 25, 2010), 8 pages.

"CERT Advisory CA-2000-02 Malicious HTML Tags Embedded in Client Web Requests", *Carnegie Mellon University*, http://www.cert.org/advisories/CA-2000-02.html., (Feb. 2, 2000), 7 pages.

"CERT.org, Understanding Malicious Content Mitigation for Web Developers", Available at http://www.cert.org/tech_tips/malicious_code_mitigation.html#9. Last accessed on Nov. 22, 2010., (Feb. 2000), 9 pages.

"Chinese Office Action", CN200680025529.2, a counterpart of U.S. Appl. No. 11/183,329, (Jul. 26, 2011), 11 Pages.

"Content Restrictions", *Version 0.9.2-2007-03-20* http://www.gerv.net/security/content-restrictions/, (Mar. 20, 2007), 3 pages.

"Enough is Enough!", Retrieved from <<https://netiles.uiuc.edu/ehowes/www/resource6>> on Aug. 17, 2005., (Apr. 14, 2002), 3 pages.

"Enterprise Start Pages and Mashup Applications Online", Available at http://datamashups.com retrieved on Jan. 28, 2008, (2006),2 pages.

"EP Office Action", European Patent application 06786875.2, a counterpart foreign application of U.S. Appl. No. 11/183,329, (Oct. 17, 2011), 5 pages.

"eTrust Access Control", Available at http://www3.ca.com/solutions/Product/aspx?ID=154, (Jun. 8, 2001), 2 pages.

"Examiner's Answer to an Appeal", U.S. Appl. No. 10/606,089, (Apr. 8, 2008), 18 pages.

"Final Office Action", U.S. Appl. No. 10/047,302, (Mar. 28, 2007), 19 pages.

"Final Office Action", U.S. Appl. No. 10/606,089, (Dec. 23, 2010), 11 pages.

"Final Office Action", U.S. Appl. No. 10/606,089, (May 29, 2007), 12 pages.

"Final Office Action", U.S. Appl. No. 10/606,089, (Jul. 15, 2011), 17 pages.

"Final Office Action", U.S. Appl. No. 10/606,089, (Jul. 24, 2006), 12 pages.

"Final Office Action", U.S. Appl. No. 11/145,530, (Jan. 6, 2010), 28 pages.

"Final Office Action", U.S. Appl. No. 11/145,530, (Oct. 27, 2010), 49 pages.

"Final Office Action", U.S. Appl. No. 11/145,530, (Dec. 8, 2008),25.

"Final Office Action", U.S. Appl. No. 11/217,748, (Oct. 11, 2011), 14 Pages.

"Final Office Action", U.S. Appl. No. 11/217,748, (Jun. 8, 2009), 11 pages.

"Final Office Action", U.S. Appl. No. 11/217,748, (Aug. 4, 2010), 13 pages.

"Final Office Action", U.S. Appl. No. 11/262,316, (Feb. 3, 2010), 13 pages.

"Final Office Action", U.S. Appl. No. 11/262,316, (Apr. 17, 2009), 14 pages.

"Final Office Action", U.S. Appl. No. 11/426,174, (Nov. 24, 2008), 28 pages.

"Final Office Action", U.S. Appl. No. 11/426,174, (Mar. 17, 2011), 28 pages.

"Final Office Action", U.S. Appl. No. 11/426,174, (May 27, 2010), 25 pages.

"Final Office Action", U.S. Appl. No. 11/426,785, (Feb. 3, 2011), 13 pages.
"Final Office Action", U.S. Appl. No. 11/426,785, Informed in an email dated Oct. 6, 2010 that this case is related.,(Feb. 8, 2010), 8 pages.
"Final Office Action", U.S. Appl. No. 11/805,088, (Sep. 21, 2010), 8 pages.
"Final Office Action", U.S. Appl. No. 12/016,654, (Oct. 28, 2011), 21 Pages.
"Final Office Action", U.S. Appl. No. 12/118,333, (Jan. 14, 2011), 17 pages.
"Final Office Action", U.S. Appl. No. 12/146,460, (Jan. 4, 2012), 13 Pages.
"Final Office Action", U.S. Appl. No. 12/146,461, (Sep. 16, 2011), 14 Pages.
"Final Office Action", U.S. Appl. No. 12/147,620, (Jul. 25, 2011), 15 pages.
"Final Office Action", U.S. Appl. No. 12/147,963, (Jan. 23, 2012), 12 Pages.
"Final Office Action", U.S. Appl. No. 12/188,333, (Mar. 15, 2010), 11 pages.
"Final Office Action", U.S. Appl. No. 12/188,333, (May 21, 2009), 10 pages.
"Final Office Action", Office Action for U.S. Appl. No. 11/183,329, (Oct. 24, 2011), 18 Pages.
"Foreign Office Action", Chinese Application No. 200680019185.4, (Aug. 4, 2010), 13 pages.
"Foreign Office Action", Chinese Application No. 200680031682.6, (Sep. 13, 2010), 16 pages.
"Foreign Office Action", Chinese Application No. 200680031682.6, (Jun. 19, 2009), 12 pages.
"From Coffee to Celebrity Sightings: How Mashups are Changing Online Mapping", *Spunlogic 2007*, www.spunlogic.com, (2007), 6 pages.
"IBM Tivoli Federated Identity Manager", Available at http://www-01.ibm.com/software/tivoli/products/federated-identity-mgr/, (Nov. 9, 2005), 5 pages.
"Intense Internet Security Pro 2005", Retrieved from <<http://www.intenseintegrations.com/catalog/iis.php>> on Aug. 17, 2005, (Jan. 9, 2005), 1 page.
"International Search Report", Application No. PCT/US2008/062763, (May 6, 2008), 12 pages.
"International Search Report", Application No. PCT/US2009/045765, (May 30, 2009), 9 pages.
"Internet-based Content Security Protection in the Net", *Internet Citation*, 2004, retrieved from <http://www.streamshield.com/resources/whitepapers.php> Dec. 20, 2005, 19 pages.
"JP Office Action", JP Application No. 2008-521517, a counterpart foreign application of U.S. Appl. No. 11/183,329, (Sep. 9, 2011), 5 Pages.
"Non Final Office Action", Application No. 1/217,748, (Jan. 2, 2009), 8 pages.
"Non Final Office Action", U.S. Appl. No. 10/047,302, (Apr. 11, 2005), 23 pages.
"Non Final Office Action", U.S. Appl. No. 10/047,302, (Aug. 4, 2006), 15 pages.
"Non Final Office Action", U.S. Appl. No. 10/606,089, (Jan. 4, 2007), 15 pages.
"Non Final Office Action", U.S. Appl. No. 10/606,089, (Feb. 15, 2006), 11 pages.
"Non Final Office Action", U.S. Appl. No. 11/145,530, (Jun. 19, 2008), 16 pages.
"Non Final Office Action", U.S. Appl. No. 11/145,530, (Jul. 17, 2009), 24 pages.
"Non Final Office Action", U.S. Appl. No. 11/183,329, (May 19, 2011), 15 pages.
"Non Final Office Action", U.S. Appl. No. 11/217,748, (Nov. 24, 2009), 13 pages.
"Non Final Office Action", U.S. Appl. No. 11/217,748, (Feb. 14, 2011), 13 pages.
"Non Final Office Action", U.S. Appl. No. 11/262,316, (Aug. 18, 2008), 16 pages.
"Non Final Office Action", U.S. Appl. No. 11/426,174, (Nov. 30, 2009), 28 pages.
"Non Final Office Action", U.S. Appl. No. 11/426,174, (Mar. 18, 2008), 19 pages.
"Non Final Office Action", U.S. Appl. No. 11/426,174, (May 12, 2009), 28 pages.
"Non Final Office Action", U.S. Appl. No. 11/426,174, (Sep. 16, 2010), 26 pages.
"Non Final Office Action", U.S. Appl. No. 11/426,785, (Jun. 27, 2011), 21 pages.
"Non Final Office Action", U.S. Appl. No. 11/426,785, Informed in an email dated Oct. 6, 2010 that this case is related.,(Jul. 21, 2010),13 pages.
"Non Final Office Action", U.S. Appl. No. 11/426,785, Informed in an email dated Oct. 6, 2010 that this case is related.,(Jul. 8, 2009),10 pages.
"Non Final Office Action", U.S. Appl. No. 12/016,654, (May 12, 2011), 18 pages.
"Non Final Office Action", U.S. Appl. No. 12/118,333, (Dec. 12, 2008), 14 pages.
"Non Final Office Action", U.S. Appl. No. 12/118,333, (Jul. 21, 2010), 9 pages.
"Non Final Office Action", U.S. Appl. No. 12/146,460, (Jun. 6, 2011), 14 pages.
"Non Final Office Action", U.S. Appl. No. 12/146,461, (Dec. 28, 2010), 12 pages.
"Non Final Office Action", U.S. Appl. No. 12/147,620, (Feb. 7, 2011), 14 pages.
"Non Final Office Action", U.S. Appl. No. 12/147,963, (Jun. 15, 2011), 10 pages.
"Non Final Office Action", U.S. Appl. No. 12/188,333, (Sep. 25, 2009), 9 pages.
"Non-Final Office Action", U.S. Appl. No. 10/606,089, (Oct. 6, 2010), 15 pages.
"Non-Final Office Action", U.S. Appl. No. 10/606,089, (Feb. 17, 2011), 20 pages.
"Non-Final Office Action", U.S. Appl. No. 10/606,089, (Mar. 1, 2012), 17 pages.
"Non-Final Office Action", U.S. Appl. No. 11/145,530, (Mar. 9, 2011), 45 pages.
"Non-Final Office Action", U.S. Appl. No. 11/145,530, (May 26, 2010), 37 pages.
"Non-Final Office Action", U.S. Appl. No. 11/762,900, (Nov. 29, 2010), 13 pages.
"Non-Final Office Action", U.S. Appl. No. 11/805,088, (Jul. 21, 2010), 7 pages.
"Non-Final Office Action", U.S. Appl. No. 12/118,321, (Oct. 17, 2011), 7 Pages.
"Non-Final Office Action", U.S. Appl. No. 11/262,316, (Aug. 19, 2009), 12 pages.
"Notice of Allowance", U.S. Appl. No. 10/047,302, (Sep. 20, 2007), 3 pages.
"Notice of Allowance", U.S. Appl. No. 11/145,530, (Aug. 8, 2011), 11 pages.
"Notice of Allowance", U.S. Appl. No. 11/262,316, (Jun. 28, 2010), 9 pages.
"Notice of Allowance", U.S. Appl. No. 11/805,088, (Jan. 9, 2012), 8 pages.
"Notification of Transmittal of the International Search Report and the Written Opinion of the International Searching Authority in International Application No. PCTIUS2008/087265", Application No. PCT/US2008/087265, (Jun. 25, 2009), 6 pages.
"Oasis Security Services Use Cases and Requirements", Retrieved from http://www.oasis-open.org/committees/security/docs/draft-sstc-saml-reqs-01.pdf, Cited in NFOA for U.S. Appl. No. 10/047,302,(May 30, 2001), 29 pages.
"PCT Search Report and Written Opinion", Application No. PCT/US06/18752, (Aug. 31, 2007), 7 pages.
"Performing Code Assist on Java Code", *JDT Plug-in Developer Guide. Programmer's Guide. JDT Core.*, retrieved from <http://help.eclipse.org/helios/topic/org.eclipse.jdt.doc.isv/guide/jdt_api_codeassist.htm> on Apr. 27, 2011, 3 pages.

"Provisional Application", U.S. Appl. No. 61/020,597, (Jan. 11, 2008), 61 pages.
"Provisional Application", U.S. Appl. No. 61/058,213, (Jun. 3, 2008), 36 pages.
"Provisional Application", U.S. Appl. No. 61/058,214, (Jun. 3, 2008), 35 pages.
"Restriction Requirement", U.S. Appl. No. 10/047,302, (Mar. 20, 2006), 4 pages.
"SpywareBlaster 3.4", Retrieved from <<http://www.javacoolsoftware.com/spywareblaster.html>> on Aug. 17, 2005, (2002), 1 page.
"SpywareGuard 2.2", Retrieved from <<http://www.javacoolsoftward.com/spywareguard.html>> on Aug. 17, 2005, (2002), 2 pages.
"Sun Java System Access Manager", Available at http://www.sun.com/software/products/access_mgr/index.xml, (Feb. 2, 2006), 3 pages.
"Supplemental Notice of Allowance", U.S. Appl. No. 11/145,530, (Oct. 26, 2011), 2 pages.
"Supplemental Notice of Allowance", U.S. Appl. No. 11/805,088, (Feb. 14, 2012), 2 pages.
"U.S. Appl. No. 61/020,597", (Jan. 11, 2008), 61 pages.
"U.S. Appl. No. 61/058,213", (Jun. 3, 2008), 33 pages.
"U.S. Appl. No. 61/058,214", (Jun. 3, 2008), 32 pages.
"Veritas OpForce", retrieved from <http://www.symantec.qassociates.co.uk/server-provisioning-veritas-opforce.htm> on Jan. 3, 2008, 3 pages.
"Virtual Sandbox 2.0", Retrieved from: <http://www.fortresgrand.com/products/vsb/vsb.htm> on Jan. 25, 2008, 3 pages.
"Wayback Machine, Security Attribute", Retrieved from <<http://web.archive.orglweb/2001_04170820_17lhttp://msdn.microsoft.comlworkshop/author/dhtmllreference/properties/security_.asp>> on Apr. 5, 2005, (Apr. 17, 2001), 3 Pages.
Alsop, Phil "Symantec: Breaking through the Dissimilar Hardware Restore Challenge", *Storage Networking Solutions (SNS) Europe*, retrieved from <http://www.snseurope.com/snslink/news/printer-friendly.php?newsid=4635> on Jan. 3, 2008,(Sep. 19, 2006), 4 pages.
Anupam, Vinod et al., "Secure Web Scripting", *IEEE Internet Computing*, vol. 2 , Issue 6, ISSN:1089-7801, (Nov. 1998), 15 pages.
Barth, Adam et al., "Securing Frame Communication in Browsers", (2008), 14 pages.
Bershad, Brian N., et al., "Lightweight Remote Procedure Call", *ACM Transactions on Computer Systems*, vol. 8, No. 1, (Feb. 1990), pp. 37-55.
Bertino, Elisa et al., "On Specifying Security Policies for Web Documents with an XML-based Language", *Symposium on Access Control Models and Technologies—SACMAT*, Retrieved from http://isrl.cs.byu.edu/pubs/X-secIntro.pdf, (2001), 9 pages.
Chang, Po-Hao "An Adaptive Distributed Object Framework for the Web", Available at http://csl.cs.uiuc.edu/docs/ecoop-phd04/main.pdf, Jun. 14-15, 2004, 10 pages.
Chen, Shuo "Light-Weight Transparent Defense Against Browser Cross-Frame Attacks Using Script Accenting", *Technical Report—MSR-TR-2007-29*, Mar. 14, 2007 http://ftp.research.microsoft.com/pub/tr/TR-2007-29.pdf. Last accessed Oct. 5, 2007, 16 pages.
Chen, Shuo et al., "A Systematic Approach to Uncover Security Flaws in GUI Logic", *IEEE Symposium on Security and Privacy*, May 2007, 15 pages.
Chess, et al., "JavaScript Hijacking", *Fortify Software*, (Mar. 12, 2007), 10 pages.
Couvreur, Juien "Curiosity is Bliss: Web API Authentication for Mashups", Available at http://blog.monstuff.com/_archives/000296.html, (Jun. 25, 2006), 5 pages.
De Keukelaera, Frederik et al., "SMash: Secure Component Model for Cross-Domain Mashups on Unmodified Browsers", *Proceeding of the 17th International Conference on World Wide Web*, Apr. 21-25, 2008, ACM Press, New York, NT, USA, 13 pages.
Dhamija, Rachna et al., "The Battle Against Phishing: Dynamic Security Skins", *Proceedings of the 2005 ACM Symposium on Usable Security and Privacy*, Available at <http://www.cs.berkeley.edu/~tygar/papers/Phishing/Battle_against_phishing.pdf>,(Jul. 20, 2005), pp. 77-88.
Edwards, Mark J., "The Guide to Internet Explorer Security Zones", Retrieved from http://www.windowsitpro.com/article/internet/the-guide-to-internet-explorer-security-zones.aspx on Dec. 7, 2010, (Jan. 2000), 3 pages.
Epstein, Kevin "Scalent Systems—Next Generation Data Center Virtualization", retrieved from <http://scalent.findtechblogs.com/?q=afcom> on Jan. 3, 2008,(Apr. 24, 2007), 1 page.
Erlingsson, Ulfar et al., "End-to-End Web Application Security", Available at http://www.usenix.org/events/hotos07/tech/_fulLpapers/erlingsson/erlingsson__html/, (Apr. 2007), 6 pages.
Evans, David E., "Policy-Directed Code Safety", Available at http://www.cs.virgina.edu/-evans/phd-thesis/thesis.ps.gz, (Feb. 2000), 137 pages.
Martin, Jr., David M., et al., "Blocking Java Applets at the Firewall", *Proceedings of the Network and Distributed System Security Symposium*, San Diego, CA, Feb. 10-11, 1997, IEEE Computer Soc., 11 pages.
McLaren, Chris et al., "Oasis SSTC SAML Protocols Schema Discussion", Retrieved from http://www.oasis-open.org/committees/security/docs/draft-sstc-protocol-discussion-01.pdf, Cited in NFOA for U.S. Appl. No. 10/047,302,(Jul. 28, 2001), 14 pages.
Miller, Mark S., et al., "Caja: Safe Active Content in Sanitized JavaScript", *Draft Tech Report*. Available at google-caja.googlecode.com/files/caja-spec-2008-01-15.pdf, (Nov. 5, 2007), 26 pages.
Muffincharizard, "Having Download Problems (About Mobile Code)", Available at http://forums.zonelabs.com/showthread.php?t=39390, (Sep. 16, 2003), 2 pages.
Murphy, Jim et al., "Securing the Enterprise from Malware Threats", Available at http://www.surfcontrol.com/uploadedfiles/general/white_papers/Malware_Whitepaper.pdf, (2004), 14 pages.
Ollmann, "HTML Code Injection and Cross-Site Scripting", http://www.techincalinfo.net/papers/CSS.html, accessed Jan. 18, 2006,(Jan. 2003), 20 pages.
Raggett, Dave "HTML 4.01", *W3C*, retrieved from <http://www.w3.org/TR/html401/present/frames.html> on May 30, 2011,(Dec. 24, 1999), 14 pages.
Reis, Charles et al., "Architectural Principles for Safe Web Programs", *Department of Computer Science and Engineering, University of Washington*, (2007),7 pages.
Reis, Charles et al., "Browsershield: Vulnerability-Driven Filtering of Dynamic HTML", vol. 1, Issue 3, *ACM Press* New York, NY, USA, (Sep. 2007), 14 pages.
Sandboxie, "Overview", Retrieved from <<http://www.sandboxie.com/>> on Aug. 17, 2005., (2004), 3 pages.
Scott, David "Specifying and Enforcing Application-Level Web Security Policies", IEEE Transactions on Knowledge and Data Engineering, vol. 15, No. 4,(Jul. 2003), pp. 771-783.
Scott, David et al., "Abstracting Application-Level Web Security", *In Proceedings of WWW 2002*, (May 2002), 13 pages.
Scott, David et al., "Developing Secure Web Applications", IEEE Internet Computing, vol. 6, No. 6,(Nov. 2002), pp. 38-45.
Scott, et al., "Design Considerations for Cross Page Post Backs in ASP.NET 2.0", http://odetocode.com/Articles/421.aspx, (Jul. 24, 2005), 9 pages.
Selkirk, A. "Using XML Security Mechanisms", *BT Technology Journal*, vol. 19, No. 3, DOI: 10.1023/A:1011930030096, (Jul. 2001), pp. 35-43.
Selkirk, A. "XML and Security", *BT Technology Journal*, vol. 19, No. 23-34, DOI: 10.1023/A:1011977913258, (Jul. 2001), pp. 23-34.
Sirer, Emin G., et al., "An Access Control Language for Web Services", In Proceedings of the 11th International Conference on World Wide Web (Honolulu, HI, USA, May 7-11, 2002). WWW '02. *ACM Press*, New York, NY, 396-407. DOI=http://doi.acm.org/1, 8 pages.
Sliwa, Carol "Microsoft Bolsters Internet Explorer Security", *Network World Fusion*, Retrieved from www.nwfusion.com/archive/1997/97-06-09micr-a.html on Nov. 22, 2010.,(Jun. 9, 1997), 2 pages.
Snell, Ned "SAMS Teach Yourself the Internet in 24 Hours", *Third Edition*, ISBN: 0-672-31589-0, Available at http://my.safaribooksonline.com/web-applications-and-services/0672315890, (Jun. 17, 1999), 528 pages.
Thorpe, Danny "Secure Cross-Domain Communication in the Browser", Available http://msdn.microsoft.com/en-us/library/bb735305(printer).aspx, (2008), 6 pages.

Vuong, Nathan N., et al., "Managing Security Policies in a Distributed Environment Using eXtensible Markup Language (XML)", *ACM Symposium on Applied Computing—SAC*, Retrieved from http://users.cis.fiu.edu/~smithg/papers/sac01.pdf, (2001), 7 pages.

Wahbe, Robert et al., "Efficient Software-Based Fault Isolation", *1993 ACM SIGOPS*, Dec. 5-8, 1993, 14 pages.

Wang, Helen J., et al., "Protection and Communication Abstractions for Web Browsers in MashupOS", *SOSP07, ACM*, Oct. 14-17, 2007, 15 pages.

Wang, Helen J., et al., "Shield: Vulnerability-Driven Network Filters for Preventing Known Vulnerability Exploits", *SIGCOMM '04*, Aug. 30-Sep. 3, 2004, Portland, OR, Available at http://dalivery.acm.org/10.1145/1_020000/1_015489/p193-wang.pdf?key1=1015489&key2=8156443411_&coll=GUIDE&dl=GUIDE&CFID=72316072&CFTOKEN=46175408, pp. 193-204.

Wang, Helen J., et al., "The Multi-Principal OS Construction of the Gazelle Web Browser", *Microsoft Research, White Paper*, (Feb. 2009), 16 pages.

Wheeler, David "Secure Programming for Linux and Unix Howto", version 2.966,(2002), 1-143.

Yoshihama, Sachiko et al., "Security Model for the Client-Side Web Application Environments", *IBM Tokyo Research Laboratory*, (May 24, 2007), 2 pages.

Zhang, Yan et al., "An Agent-Based Framework for Cross-Domain Cooperation of Enterprise", *Computer Supported Cooperative Work in Design*, 2004. http://ieeexplore.ieee.org/xpl/abs_free.jsp?arNumber=1349034, printed on Apr. 13, 2006, (May 26, 2004), 1 page.

Zviran, Moshe et al., "Towards Generating a Data Integrity Standard", *Data and Knowledge Engineering*, vol. 32, Issue 3, (Mar. 2000), pp. 291-313.

"Final Office Action", U.S. Appl. No. 12/118,321, (Apr. 12, 2012), 11 pages.

"Non Final Office Action", U.S. Appl. No. 12/199,813, (Apr. 24, 2012), 6 pages.

"Non Final Office Action", U.S. Appl. No. 12/199,813, (May 4, 2012), 11 pages.

"Notice of Allowance and Fees", U.S. Appl. No. 11/217,748, (May 14, 2012), 9 Pages.

"Notice of Allowance and Fees", U.S. Appl. No. 12/147,963, (May 29, 2012), 11 Pages.

"Notice of Allowance", U.S. Appl. No. 11/426,174, (Apr. 19, 2012), 21 pages.

"Notice of Allowance", U.S. Appl. No. 11/426,785, (Apr. 13, 2012), 10 pages.

"Supplemental Notice of Allowance", U.S. Appl. No. 11/805,088, (Apr. 23, 2012), 2 pages.

Berners-Lee, et al., "Uniform Resource Identifier (URI): Generic Syntax", retrieved from << http://tools.ietf.org/html/rfc3986>> on Mar. 27, 2012,(2005), 62 pages.

Jermyn, et al., "Out of The Sandbox", *Third Party Validation for Java Applications, Int. Soc. Comput. & Their Appl.* Mar. 25-27, 1998, http://webcache.googleusercontent.com/search?q=cache:TNkXZnwTSGoJ:www.cs.nyu.edu/milan/publications/cata98.ps.gz+&cd=1&hl=en&ct=clnk&gl=us,(5/1998), 5 Pages.

Lopes, et al., "A Uniform Resource Identifier Scheme for SNMP", *2002 IEEE*, retrieved from: <<http://bibliotecadigital.ipb.pt/bitstream/10198/2244/1/snmpUrl-rpl-jlo.pdf>>,(2002), 6 pages.

Malkhi, et al., "Secure execution of Java applets using a remote playground", *IEEE*, vol. 26, retrieved from <<http://avirubin.com/playground.pdf>>,(Dec. 2000), 12 Pages.

Paternostro, et al., "Advanced Features of the Eclipse Modeling Framework", http://eclipse.org/emf/docs/_presentations/EclipseCon/, retrieved from:<<http://www.eclipse.org/modeling/emf/docs/presentations/EclipseCon/EclipseCon2006_EMF_Advanced.pdf>>,(Mar. 20, 2006), 106 pages.

Ray, et al., "Programming Web Services with Perl", *Publisher: O'Reilly Media, Inc. Chapter 11 REST: Representational State Transfer*, (Dec. 19, 2002), pp. 237-261.

Fettig, Abe "How to Make XMLHttpRequest Calls to Another Server in Your Domain", http://ajaxian.com/archives/how-to-make-xmlhttprequest-calls-to-another-server-in-your-domain. Last accessed Oct. 28, 2010, (Nov. 29, 2005), 2 pages.

Gong, Li et al., "Going Beyond the Sandbox: An Overview of the New Security Architecture in the Java Development Kit 1.2", *Proceedings of the USENIX Symposium on Intervet Technologies and Systems*, Monterey, CA, (Dec. 1997), 10 pages.

Hallam-Baker, Phillip "X-TASS: XML Trust Assertion Service Specification", *VeriSign, Version 0.9*, Retrieved from http://www.oasis-open.org/committees/security/docs/draft-xtass-v09.pdf, (Jan. 5, 2001), 26 pages.

Howell, Jon et al., "MashupOS: Operating System Abstractions for Client Mashups", *Proceedings 11th USENIX workshop on Hot Topics in Operating Systems*, (2007), 7 pages.

IEBLOG, "Using Frames More Securely", Available at http://blogs.msdn.com/ie/archive/2008/01/18/using-frames-more-_securely.aspx, (Jan. 18, 2008), 19 pages.

Jackson, Collin et al., "Subspace: Secure Cross-Domain Communication for Web Mashups", In Proceedings of WWW 2007,(May 2007), pp. 611-619.

Jajodia, Sushil et al., "A Unified Framework for Enforcing Multiple Access Control Policies", *In Proceedings of the 1997 ACM SIGMOD International Conference on Management of Data* (Tucson, AZ, USA)., (1997), 12 pages.

Jim, Trevor et al., "Defeating Script Injection Attacks with Browser-Enforced Embedded Policies", *In Proceedings of WWW 2007*, May 8-12, 2007, available at <http://www2007.org/papers/paper595.pdf>, pp. 601-610.

Johansson, Jesper et al., "Dealing with Contextual Vulnerabilities in Code: Distinguishing between Solutions and Pseudosolutions", *Computers and security*, vol. 22, (2003), pp. 152-159.

Jose, Rui et al., "Integrated Context Management for Multi-domain Pervasive Environments", *MCMP-05*, Available at <https://repositorium.sdum.uminho.pt/bitstream/1822/2878/1/2005-MCMP-vade-context_final.pdf>,(May 2005), 10 pages.

Kals, Stefan et al., "SecuBat: A Web Vulnerability Scanner", *WWW 2006*, Available at <http://www.seclab.tuwien.ac.at/papers/secubat.pdf>,(May 2006), 10 pages.

Karger, David R., et al., "Haystack: A User Interface for Creating, Browsing, and Organizing Arbitrary Semistructured Information", *CHI 2004 Demonstration*, Apr. 24-29, 2004, Vienna, Austria, ACM 1-58113-703-6/04/0004, pp. 777-778.

* cited by examiner

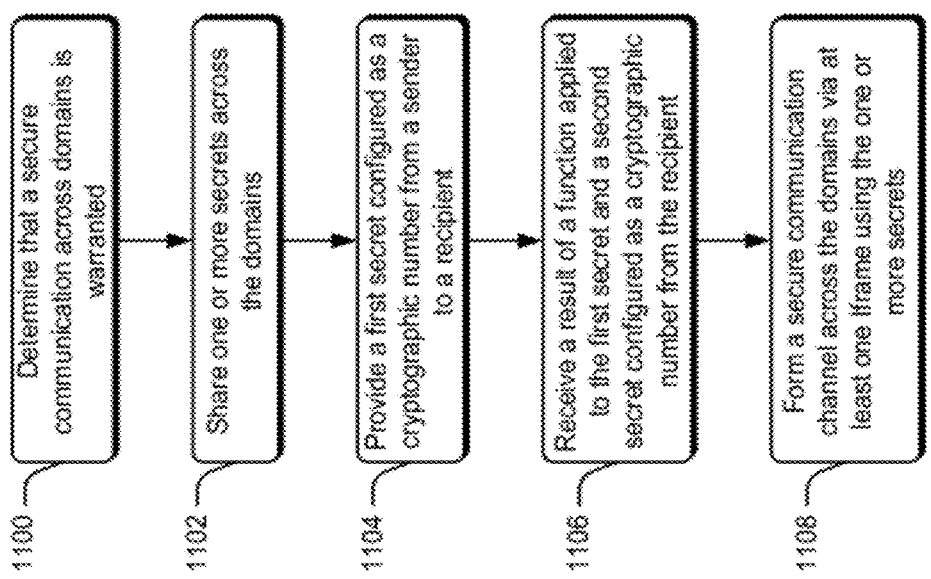

COMMUNICATION ACROSS DOMAINS

RELATED APPLICATIONS

This application is a continuation of and claims priority to U.S. patent application Ser. No. 11/805,088, filed May 22, 2007, which is a continuation-in-part of and claims priority to U.S. patent application Ser. No. 11/426,174, filed Jun. 23, 2006, the entire disclosures of which are incorporated by reference.

BACKGROUND

Through the use of web browsers (also known simply as "browsers"), users may obtain a wide variety of content from the Internet, such as online banking, email, and so on. However, the users may also be exposed to malicious parties via the Internet when browsing between network sites. For example, a malicious party may engage in a "phishing" scheme to obtain personal information from the users which may then be used to steal the users' identities, such as to purchase goods and services using credit information obtains from the users. In another example, the malicious party may attempt a "hack" to disable the users' computers, obtain personal information, and so on.

One technique that was developed to protect against these malicious parties employs security mechanisms around Cross-Site Scripting (XSS), which is used to prevent a single webpage from having multiple domains freely share data. For example, web pages are typically associated with domains. If a webpage from a domain attempts to communicate or execute a script on a webpage from another domain, typical browsers will disallow the communication or script execution. However, this may also serve to limit functionality available to the users' that may also be used for legitimate purposes, such as to share data between trusted domains.

SUMMARY

Communication across domains is described. In at least one implementation, a determination is made that an amount of data to be communicated via an Iframe exceeds a threshold amount. The data is divided into a plurality of portions that do not exceed the threshold amount. A plurality of messages is formed to communicate the divided data across domains.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

FIG. 11 is a flow diagram that describes a process for secure cross domain communication.

DETAILED DESCRIPTION

Overview

Figure 1:
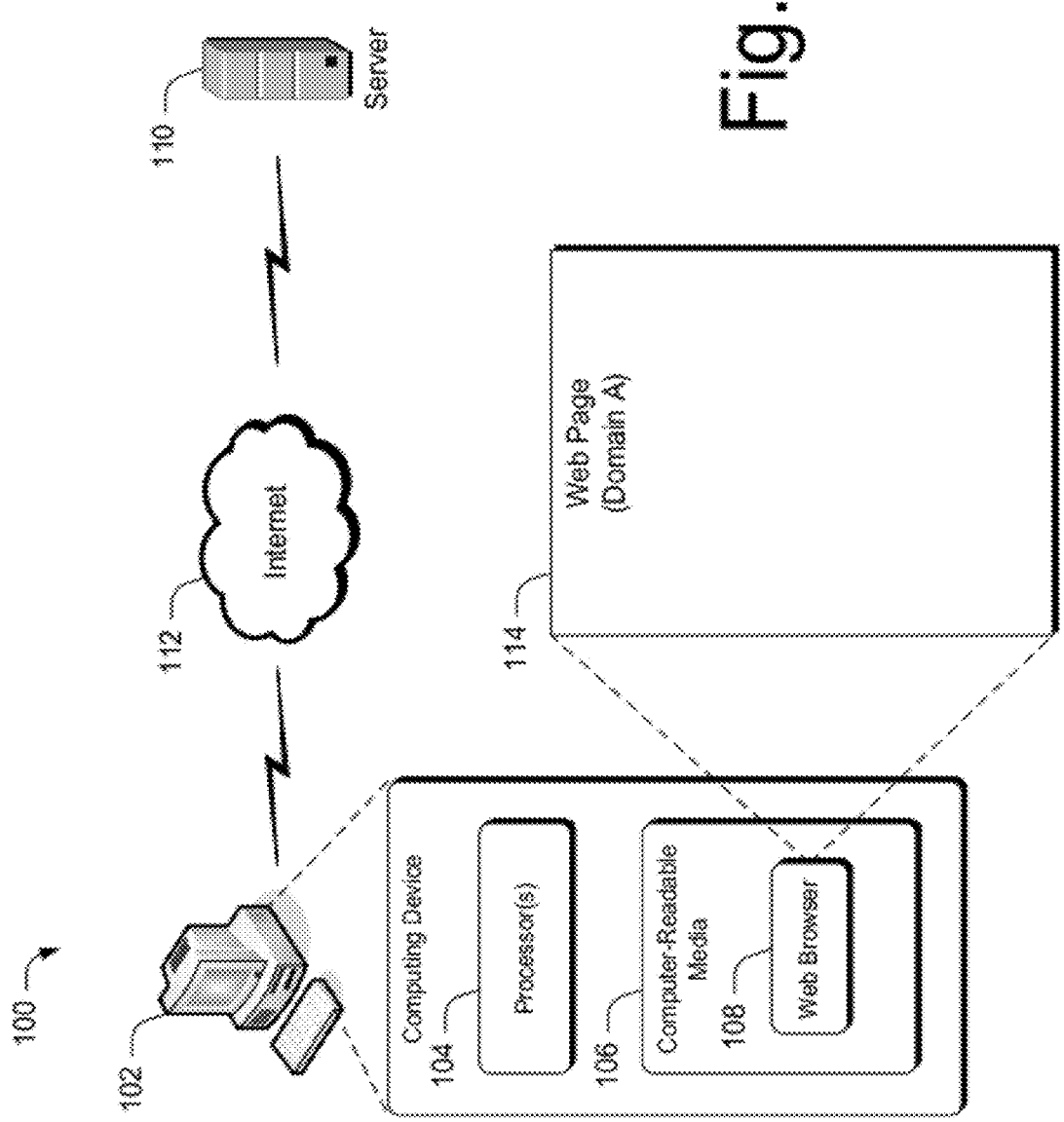
FIG. 1 illustrates an exemplary environment, in accordance with one embodiment, in which the inventive embodiments can be employed.

Various embodiments utilize nested Iframes within a web page to allow cross domain communication. That is, various embodiments can create an embedded Iframe that shares the domain of an Iframe or web page with which communication is desired. Because the embedded Iframe shares the domain of the Iframe or web page with which communication is desired, restrictions on cross-site scripting do not inhibit communication or scripting between the domain-matched Iframe(s) and/or web page. This embedded Iframe can then provide a mechanism by which web pages or Iframes from other domains can communicate with the Iframe or web page with which the embedded Iframe shares a domain.

The inventive approach can be utilized in the context of sending insecure and secure messages. Further, in at least some embodiments, reliability can be enhanced by providing a reliability mechanism that can be used to track and confirm messages that are sent back and forth between the domain-matched Iframe and web page.

Iframes and the manner in which Iframes work will be appreciated by the skilled artisan and, as such, are not described in great detail here. However, for some basic context on Iframes, consider the following.

An Iframe is a construct which embeds a document, such as a web page, into an HTML document. Traditionally, Iframes have been used so that embedded data can be displayed inside a sub-window of the browser's window. This does not mean full inclusion; the two documents are independent, and both them are treated as complete documents, instead of treating one as part of the other.

Basically, an Iframe element is of the form:

<iframe src="URL" more attributes>
</iframe>

Browsers which support Iframes display or load the document referred to by the URL in a subwindow, typically with vertical and/or horizontal scroll bars; such browsers ignore the content of the Iframe element (i.e., everything between the start tag <iframe . . . > and the end tag </iframe>). In the discussion that follows, Iframe are re-purposed, in a sense, to enable cross domain communication.

In the discussion below, the following primary sections are provided. First, a section entitled "Exemplary Environment"

is provided and describes but one example of an environment in which the inventive embodiments can be employed. Following this, a section entitled "Establishing a Cross Domain Message Delivery System" is provided and describes how a cross domain message delivery system can be created in accordance with one embodiment. Next, a section entitled "Using the Cross Domain Message Delivery System" is provided and describes how one can use the cross domain message delivery system in accordance with one embodiment. Following this, a section entitled "Reliable Messaging" is provided and describes one embodiment in which a degree of reliability can be added to the cross domain communication of messages. Further, a section entitled "Using Cross Domain Communication to Facilitate Social Networking" is provided and describes but one example of how cross domain communication can be utilized. Yet further, a section entitled "Cross Domain Communication of Data over a Threshold Amount" describes but one example of how cross domain communication can be utilized using a plurality of messages to communicate data greater than an amount permitted in a single message. Yet still further, a section entitled "Asynchronous Cross Domain Communication" describes but one example of an asynchronous communication that may be performed utilizing a buffer, although implementations are also contemplated in which asynchronous communication is performed without a buffer. Finally, a section entitled "Cross Domain Communication Security Techniques" describes examples of security techniques that may be employed to provide cross domain communication, such as a permissions-based security mechanism which asks for confirmation of data to be sent to a third party site.

Exemplary Environment

FIG. 1 illustrates an exemplary environment, in accordance with one embodiment, in which the inventive embodiments can be employed generally at 100. Here, system 100 includes a client computing device 102 which includes one or more processors 104 and one or more computer-readable media 106 on which executable, computer-readable instructions reside. In this example, computer-readable media 106 includes instructions in the form of code that implements one or more applications such as web browser 108. The various embodiments described below can be implemented in connection with any suitable type of application.

Web browser 108 is configured to communicate with one or more servers 110 via a network such as the Internet 112. In practice, browser 108 can receive web content from server 110 and render such content for a user in the form of a web page, an example of which is shown at 114. In the examples below, browser 108 can be used to render Iframes within a web page to create a cross domain message delivery system that can permit cross domain communication, as will become apparent.

It is to be appreciated and understood that while computing device 102 is illustrated as a desk top computing device, other computing devices such as laptop devices, notebook devices, handheld devices and the like can be utilized without departing from the spirit and scope of the claimed embodiments.

Establishing a Cross Domain Message Delivery System

Figure 2:
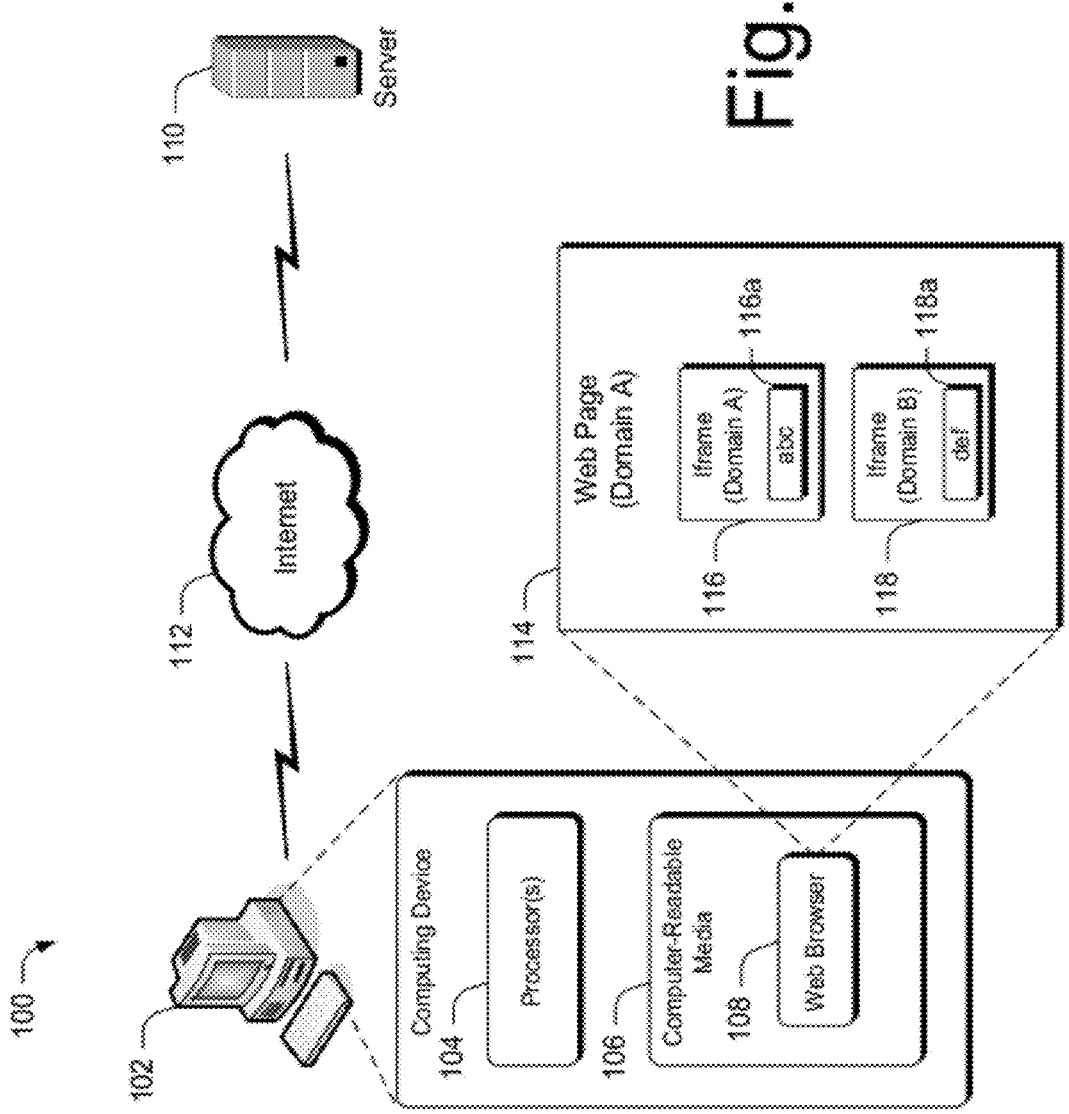
FIG. 2 illustrates the system of FIG. 1 in which a cross domain message delivery system has been created in accordance with one embodiment.

FIG. 2 illustrates the system of FIG. 1 in which a cross domain message delivery system has been created in accordance with one embodiment. In this particular example, web page 114 includes two different Iframes that have been created—Iframe 116 and Iframe 118. It is possible for the web page to include a single Iframe and for the cross domain communication techniques to be implemented using that one Iframe. However, for this example, Iframes 116 and 118 are used.

Web page 114 is said to be a "containing page" because it contains the two created Iframes. In this example, web page 114 has been created in a first domain—domain A. Notice here that Iframe 116 has been created in domain A and Iframe 118 has been created in domain B. Each of Iframes 116 and 118 includes or contains, in this example, a listener Iframe that shares its Iframe's domain. Hence, Iframe 116 contains listener Iframe 116a and Iframe 118 contains listener Iframe 118a. Iframes 116 and 118 can be considered as "containing frames" because they contain other Iframes. The listener Iframes 116a, 118a can be considered as embedded or nested Iframes that serve as target windows for cross domain communication that takes place, as will become apparent below.

In accordance with one embodiment, the cross domain message delivery system can be created as follows.

When the containing page—here page 114—loads, it creates Iframe 116 in its own domain and passes into the Iframe a name that is to be used for a corresponding listener Iframe. Although any suitable name can be used, in this example the name comprises a private hash which, in the illustrated example, is represented as "abc". Iframe 116 then creates the listener or nested Iframe 116a in its domain using the private hash as its name. Nested Iframe 116a is associated with a URL that is used for cross domain communication and is the message receiver or target window for messages intended for containing page 114.

In addition, containing page 114 can also create Iframe 118 in a different domain—domain B—and pass in a name that is to be used for a corresponding listener Iframe. Although any suitable name can be used, in this example the name comprises a private hash which, in the illustrated example, is represented as "def". Iframe 118 then creates the listener or nested Iframe 118a in its domain using the private hash as its name. Nested Iframe 118a is associated with a URL that is used for cross domain communication and serves as the message receiver or target window for messages intended for the containing Iframe 118.

In this example, if communication is to take place between Iframes 116 and 118, each is provided with the name of the listener Iframe for the other. So, for example, Iframe 116 is provided with the name "def" and Iframe 118 is provided with the name "abc". This can typically take place when the Iframe is initially created in the containing page 114.

Figure 3:
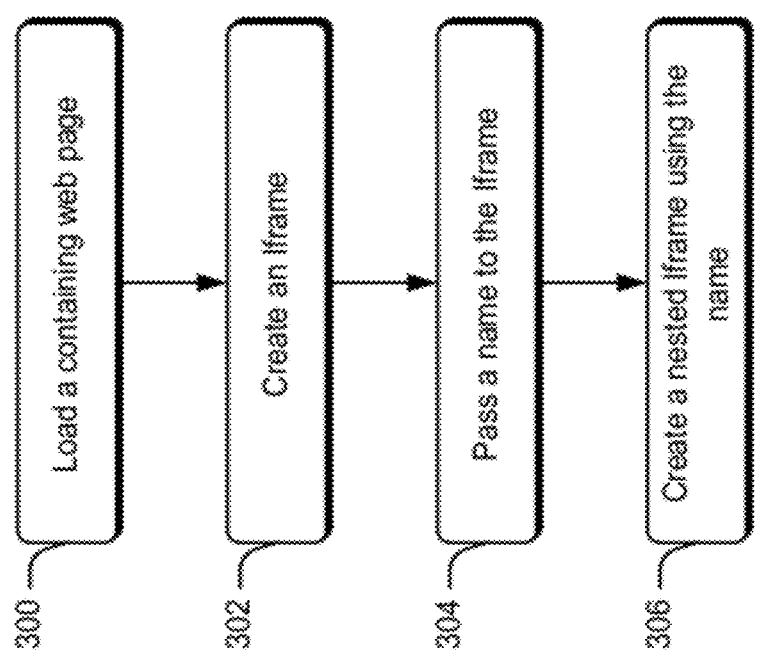
FIG. 3 is a flow diagram that describes a process for creating a cross domain message system in accordance with one embodiment.

FIG. 3 is a flow diagram that describes a process for creating a cross domain message system in accordance with one embodiment. The method can be implemented in connection with any suitable hardware, software, firmware or combination thereof. In but one embodiment, the method can be implemented in software in the form of a web browser.

Step 300 loads a containing web page and step 302 creates an Iframe that is contained within the web page. Step 302 can be performed multiple different times to create multiple different Iframes in the same and/or different domains from that of the containing web page. Step 304 passes a name to the Iframe. This step can be performed multiple different times as well and can be performed as part of the process of creating the Iframe. The name is to be used in connection with a nested listener Iframe that is to be created. Step 306 creates a nested Iframe using the name that was passed to the Iframe. This step can be performed multiple different times and can be performed by a corresponding Iframe that was created.

At this point, a cross domain message system, such as that illustrated in FIG. 2 has been created and can be used to message across different domains.

Using the Cross Domain Message Delivery System

In accordance with one embodiment, when a web page from a different domain wishes to communicate with a particular Iframe, it manipulates a URL associated with the Iframe's listener Iframe and includes, in the URL, the message that is desired to be communicated to the Iframe. In this particular example, cross domain communication can take place in connection with a server. This can permit a degree of security that is provided by the server. That is, the server can process the cross domain messages in many different ways such as by validating the messages, verifying the sender and the like.

For example, in the example of FIG. 2, assume that web page 114 wishes to communicate with Iframe 118. To do so, web page 114 might initiate a server call to open a window or load a page in the listener Iframe for Iframe 118 as follows:

window.open(http://Domain_B/secure_msg.aspx?[message] def)

This call opens a window in the B domain, and it calls a secure message page "secure_msg.aspx" to implement some type of security procedure. After this portion of the URL, the message that is intended to be sent, i.e., "[message]" is appended, as is the name of the window to which the message is targeted—here, "def".

Assuming that any security issues pertaining to the message are resolved favorably, the server then causes the message to load in the nested Iframe 118a which is in Iframe 118's domain. Nested Iframe 118a can then notify its parent or containing Iframe that it has a message. Iframe 118 can then process the message accordingly, as by executing scripts using the message.

To respond, Iframe 118 would simply issue a call to open a window or load a page in the listener Iframe 116a for Iframe 116. This call, routed through the server, would then cause a window to be opened or a page which contains the message to be loaded in listener Iframe 116a.

Figure 4:
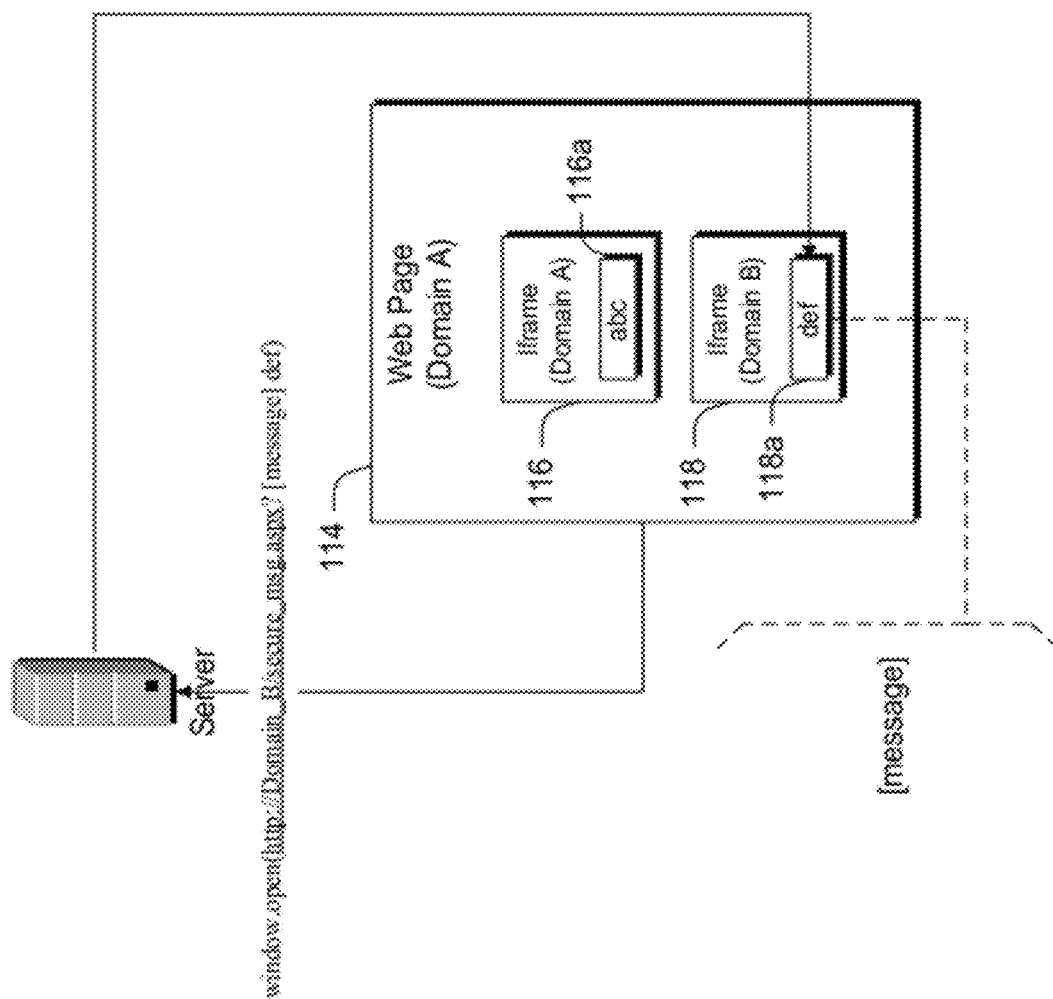
FIG. 4 illustrates cross domain communication in accordance with one embodiment.

This process is diagrammatically shown in FIG. 4. Here, web page 114 initiates a call to open a window in the listener Iframe for Iframe 118. The call, which includes the message that is to be communicated across different domains, is routed through the server and the server then causes a corresponding window or page to be loaded in the listener Iframe 118a for Iframe 118. This page includes the message from web page 114. Hence, using this approach can allow messages and other information to be communicated across different domains.

Figure 5:
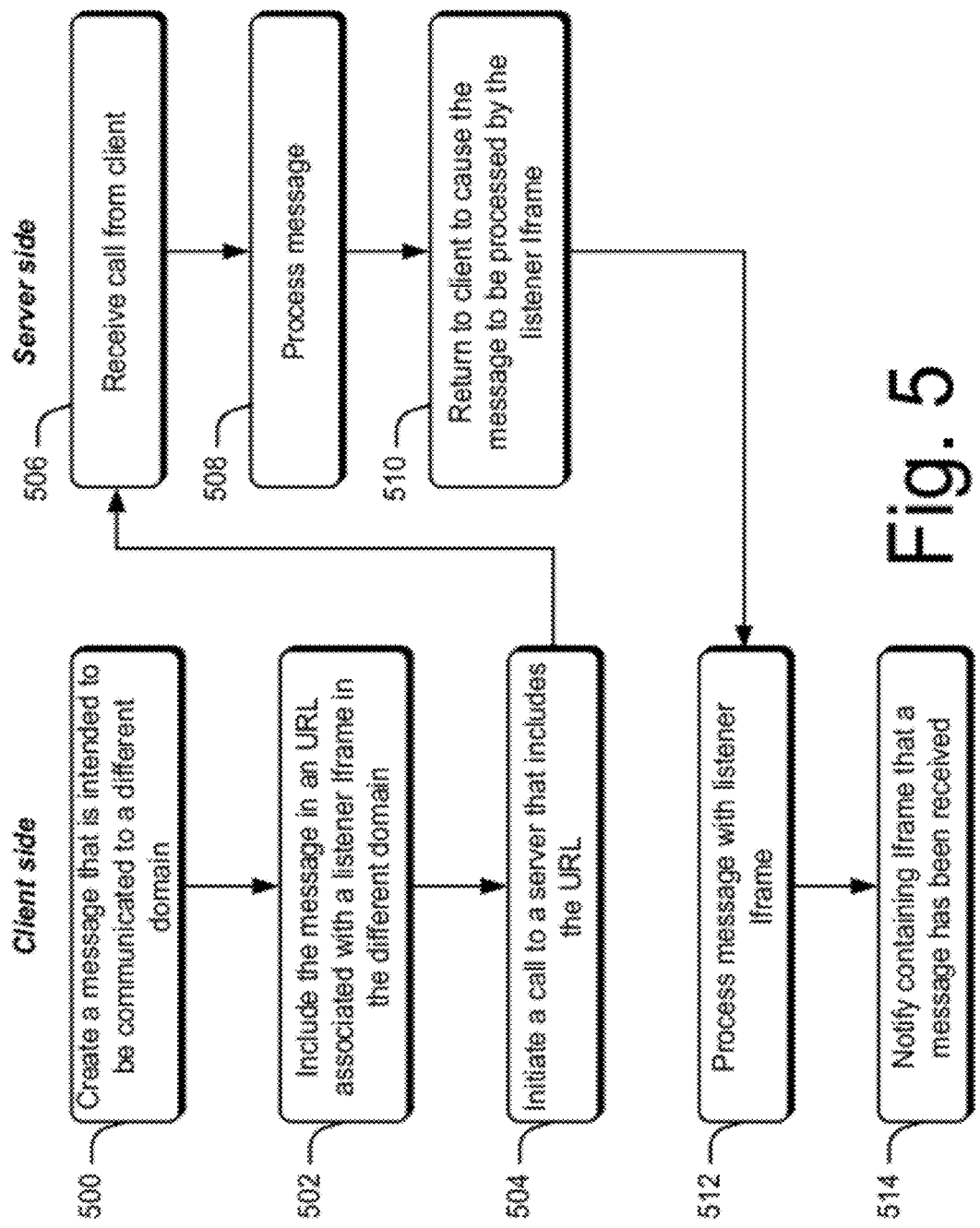
FIG. 5 is a flow diagram that describes a process for using a cross domain message system in accordance with one embodiment.

FIG. 5 is a flow diagram that describes a process for using a cross domain message system in accordance with one embodiment. The method can be implemented in connection with any suitable hardware, software, firmware or combination thereof. In but one embodiment, the method can be implemented in software. In the explanation that follows, acts or steps that are performed on the client side are designated as such. Likewise, acts or steps that are performed on the server side are designated as such.

Step 500 creates a message that is intended to be communicated to a different domain. Any suitable type of message can be created. For example, one message might be a refresh message that causes another document to refresh (e.g., a stock list component can be notified to refresh stock quotes. Other messages can present ambient properties pertaining to the mode of a page such as "author" versus "view" mode, or share stylistic information (e.g., a stock quote component can switch to allow new stocks to be added, or a particular theme can be shared with the component. Further, some messages can request metadata (e.g., a list of contacts, books and the like can be requested and returned to the other page).

Step 502 includes the message in a URL associated with a listener Iframe in the different domain. One example of how this can be done is provided above. Step 504 initiates a call to a server that includes the URL. One example of how this can be done is provided above.

Step 506 receives the call from the client at the server and step 508 processes the message. Any suitable processing can take place. In the example above, the processing that takes place pertains to security. Other types of processing can take place. Step 510 returns to the client to cause the message to be processed by the listener Iframe.

Step 512 processes the message with the listener Iframe and step 514 notifies the containing Iframe that a message has been received. This step is performed by the listener Iframe.

In the embodiment described just above, a server is utilized to facilitate cross domain message delivery. Incorporating a server into the process can enable the message processing to be augmented in some way, such as by providing server-enhanced security processes. It is possible, however, for cross domain message delivery to take place in a purely client side manner without round tripping to the server.

In this embodiment, cross domain messages are sent by manipulating the URL of the Iframe that is contained with a web page. As an example, consider the following. Each individual Iframe in a web page is associated with an URL. An URL typically has the following form:

scheme://authority/path?query#fragment

The "authority" typically consists of the name or IP address of a server, optionally followed by a colon and a TCP port number. It may also contain a username and password for authenticating to the server. The "path" is a specification of a location in some hierarchical structure, using a slash ("/") as delimiter between components. The "query" typically expresses parameters of a dynamic query to some database, program, or script residing on the server. The "fragment" occurs after the hash "#" and identifies a portion of a resource, often a location in a document. Fragments or hashes are interpreted on the client side and are not typically used by the server.

In accordance with this embodiment, when a containing page from a different domain wishes to communicate or send a message to an Iframe in another domain, it appends the message to the appropriate Iframe's URL after the hash. Thus, a message to an Iframe from another domain would take the following form:

scheme://authority/path?query#[message]

When the Iframe detects the URL change, it can parse the URL to access the message and can then process the message accordingly. If the Iframe wishes to communicate back to the containing page or another listener, it uses a similar approach—that is, it manipulates the URL of the intended recipient to append the message after the hash in the recipient's URL. If the intended recipient is a listener Iframe for the containing page, then the listener Iframe can receive the message and because it shares the domain of the containing page, it can call functions in the containing page—such as a notification function to notify the containing page that it has received a new message.

In this embodiment, all of the message sending and receiving can take place without round tripping to the server. Thus, server resources can be conserved.

Reliable Messaging

In at least some embodiments, message reliability can be enhanced by adding a unique message counter associated with each message that is sent from a particular domain. For example, in some instances, a particular Iframe may be the subject of a number of incoming messages. Yet, if these messages arrive at the same time, there is a chance that at least some of the messages will be missed. In this case, each message from a particular domain is associated with a unique, incremental ID that is incremented for each new message from that domain. When the Iframe receives a particular message from a particular domain, if the message counter is off by one or more increments, then the Iframe knows to request the missing messages from the sender. The message counter can be implemented as a field in the URL associated with the targeted recipient of the message.

Alternately or additionally, reliable messaging can be enhanced by having individual Iframes communicate back acknowledgements to the message originator that a particular message has been received. The message originator can also, if so desired, query the recipient to ascertain whether the recipient received the message.

Other Extensions

Using the above-described approach, a containing web page can also act as an intermediary between Iframes from different domains or allow the frames to communicate directly by giving each the name of the target window in the other. One of the things that this can enable is remote procedure calls or RPC. That is, a message schema can be utilized that allows messages to be defined for invoking methods or operations in other domains. In this way, a distributed RPC-like mechanism is provided for executing actions in other domains.

Using Cross Domain Communication to Facilitate Social Networking

There are instances when it would be desirable to enable a third party web site to utilize aspects of a user's relationships with others to provide the user a rich experience. For example, a user may have a large "buddy list" as part of their instant messaging application. Some third party web site might have applications that could provide the user with a rich and robust experience if it only had access to the buddy list. For example, a third party web site might be able to show you all of your buddies' wish lists. Yet, for purposes of privacy, it is not desirable to provide the third party web site with access to the user's buddy list.

In the embodiment described below, nested Iframes are utilized to provide a rich and robust experience in which relationship information can be shared, yet protected.

Figure 6:
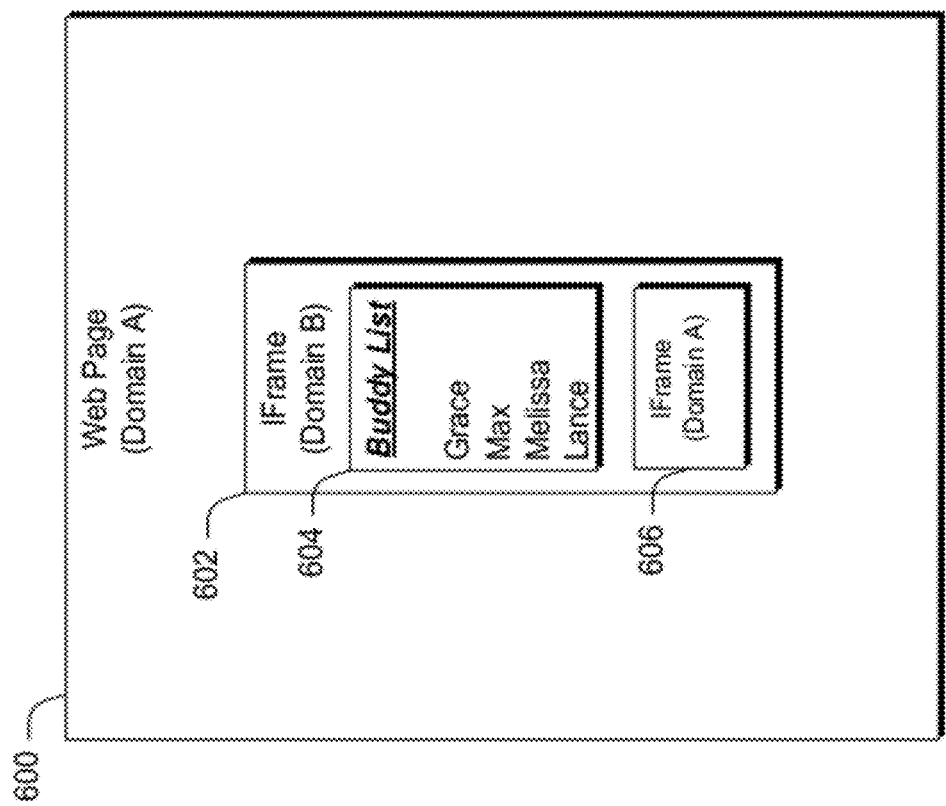
FIG. 6 illustrates a web page and Iframes in accordance with one embodiment.

As an example, consider FIG. 6. There, a web page or containing page 600 created in domain A includes an Iframe 602 created in domain B, a buddy list 604 that has been rendered in domain B, and an Iframe 606 in domain A that is contained within Iframe 602. Because of restrictions on cross site scripting, neither web page 600 nor Iframe 606 can access the buddy list that resides in domain B. Yet, there are circumstances when it might be desirable to allow web page 600 to use relationship information associated with buddy list 604 while, at the same time, allow cross site scripting restrictions to disallow access to the buddy list.

That is, in this instance, the ability is provided to send information associated with Iframe 602 to web page 600. In accordance with one embodiment, when web page 600 loads, it creates Iframe 602 and provides it with a postback URL that can be used to communicate with web page 600. When Iframe 602 creates nested Iframe 606 (in the same domain as web page 600), it provides the nested Iframe with information on the postback URL. Since Iframe 606 and web page 600 are in the same domain, there are no cross site scripting restrictions that would prevent them from communicating. The web page 600 and Iframe 606 can now communicate using, for example, JavaScript.

Figure 7:
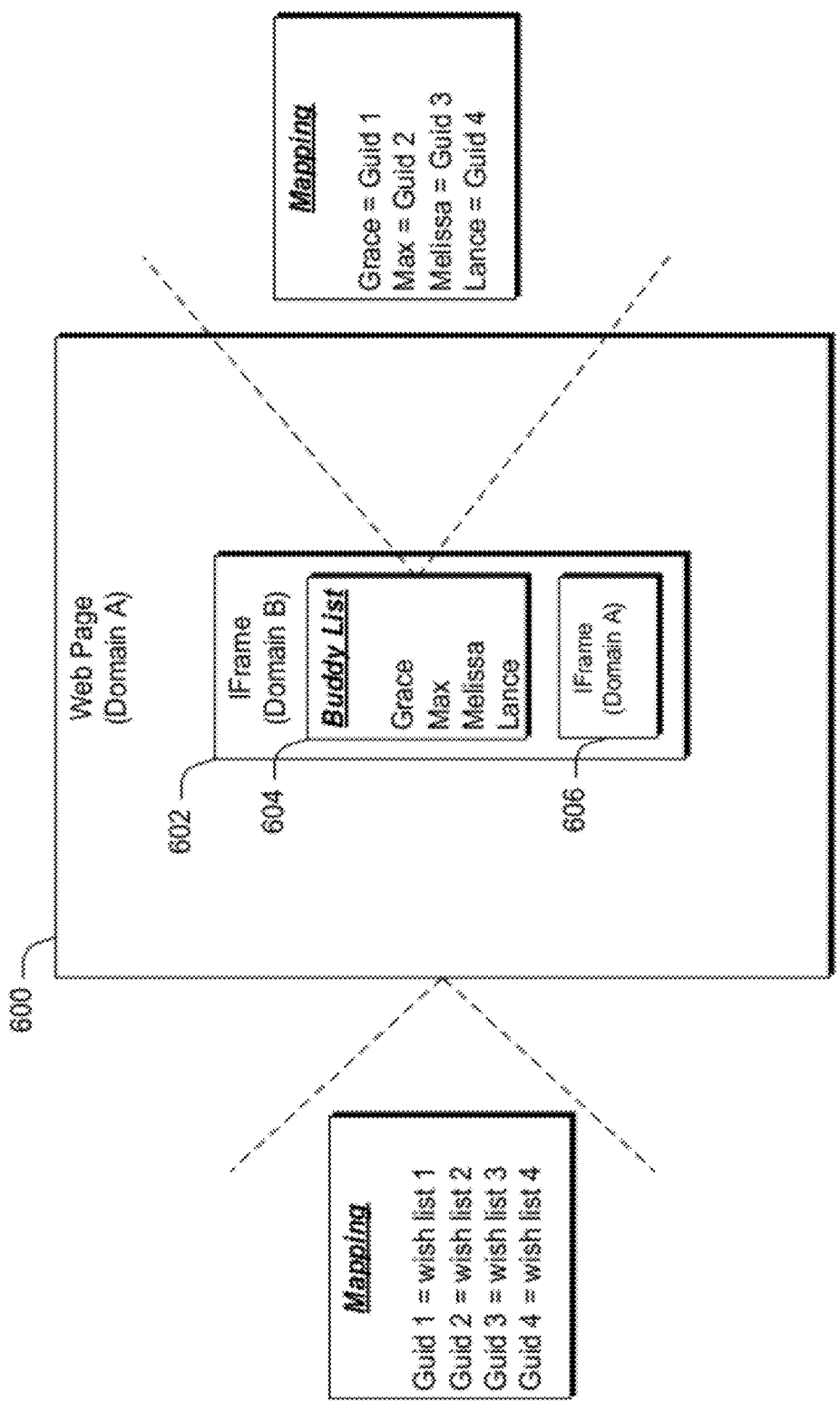
FIG. 7 illustrates the FIG. 6 web page and Iframes in accordance with one embodiment.

Consider now FIG. 7 in conjunction with the following example. Assume that web page 600 is associated with a large on-line retailer that sells books, music CDs and the like. Assume also that a user has browsed to the page and responsively, Iframe 602 has loaded their buddy list. Assume also that web page 600 asks the user if they would like to view wish lists for any of their buddies. Assume now that the user clicks on one of their buddies. In this embodiment, each buddy is mappable to a unique ID or Guid. Because of cross-site scripting restrictions, this mapping is available within domain B but not domain A. The Guid for the user's particular friend is retrieved and rendered as a web page inside Iframe 606 using, for example, techniques described above. Now, using the Guid that was just rendered, Iframe 606 uses the web page's post back URL (or some other form of communication) to provide the Guid to web page 600. Having the Guid, web page 600 has access to a mapping of Guids to wish lists. Hence, the web page can now render the particular buddy's wish list for the user, without having access to the buddy's identity or any other of the buddy's information.

In this way, third party web sites can access and leverage relationship information associated with a particular user, while at the same time such relationship information is protected.

Cross Domain Communication of Data over a Threshold Amount

In accordance with one embodiment, cross domain communication may be utilized to communicate data that exceeds a threshold amount that is permitted to be communicated using a single message. For example, in some instances a threshold may be set at 2,083 bytes which corresponds to an amount of data that may be permitted for communication in a single tag. To permit communication of amount of data that are greater than this threshold amount, a "chunking" technique may be implemented to divide this data from communication across domains using a plurality of messages.

Figure 8:
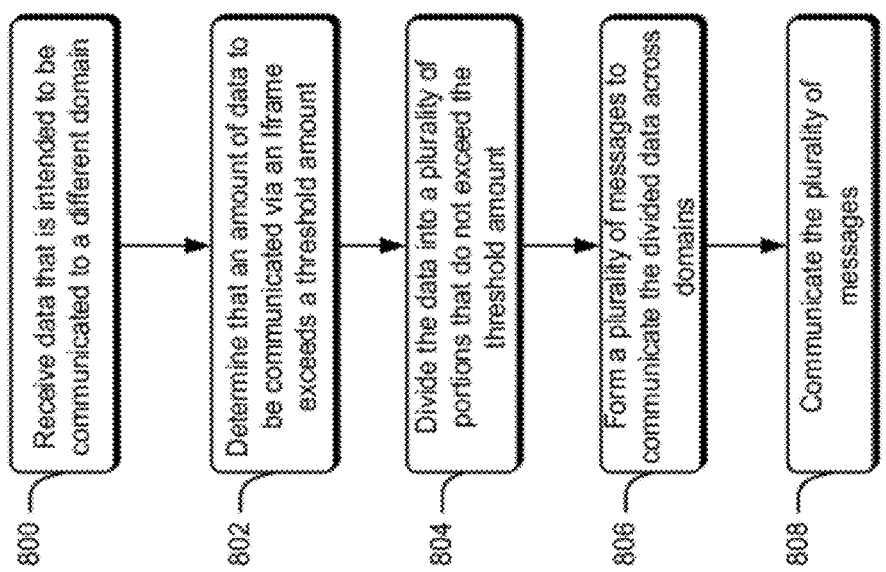
FIG. 8 is a flow diagram that describes a process for cross domain communication of data that exceeds a threshold amount that is permitted to be communicated via a single message.

FIG. 8 is a flow diagram that describes an exemplary process for cross domain communication of data that exceeds a threshold amount that is permitted to be communicated via a single message in accordance with one embodiment. The process can be implemented in connection with any suitable hardware, software, firmware or combination thereof. In but one embodiment, the method can be implemented in software.

Step 800 receives data that is intended to be communicated to a different domain. The data may be configured for a variety of purposes, such as refresh messages, present ambient properties, request metadata, and so on as previously described.

Step 802 determines that an amount of data to be communicated via an Iframe exceeds a threshold amount. A sender (e.g., an Iframe or a webpage), for instance, may determine that the amount of data to be communicated to a recipient (e.g., another Iframe or webpage) exceeds 2083 bytes, which is an amount of data in an implementation that is permitted to be communicated via an Iframe in a single message.

Step 804 divides the data into a plurality of portions that do not exceed the threshold amount. For example, the sender may divide the data into portions that do not exceed 2083 bytes.

Step 806 forms a plurality of messages to communicate the divided data across domains and step 808 communicates the plurality of messages. As previously described, cross domain messages may be sent by manipulating the URL of the Iframe that is contained with a web page. For instance, when the sender from a different domain wishes to communicate or send a message to an Iframe in another domain, it appends the portion of the data to the appropriate Iframe's URL after the hash. In this way, the portion forms a "body" of the message, which may take the following form:

scheme://authority/path?query#[message]

When the Iframe detects the URL change, it can parse the URL to access the message and can then process the message accordingly. If the Iframe wishes to communicate back to the containing page or another listener, it uses a similar approach—that is, it manipulates the URL of the intended recipient to append the message after the hash in the recipient's URL. If the intended recipient is a listener Iframe for the containing page, then the listener Iframe can receive the message and because it shares the domain of the containing page, it can call functions in the containing page—such as a notification function to notify the containing page that it has received a new message. A variety of communication techniques may be employed, such as synchronous communication having a time basis or asynchronous communication, further discussion of which may be found in relation to the following section.

Asynchronous Cross Domain Communication

In accordance with one embodiment, asynchronous communication may be utilized to communicate data across domains. Further, queues may be employed by one or both sides (e.g., sender and/or receiver) to further improve efficiency of the communication.

Figure 9:
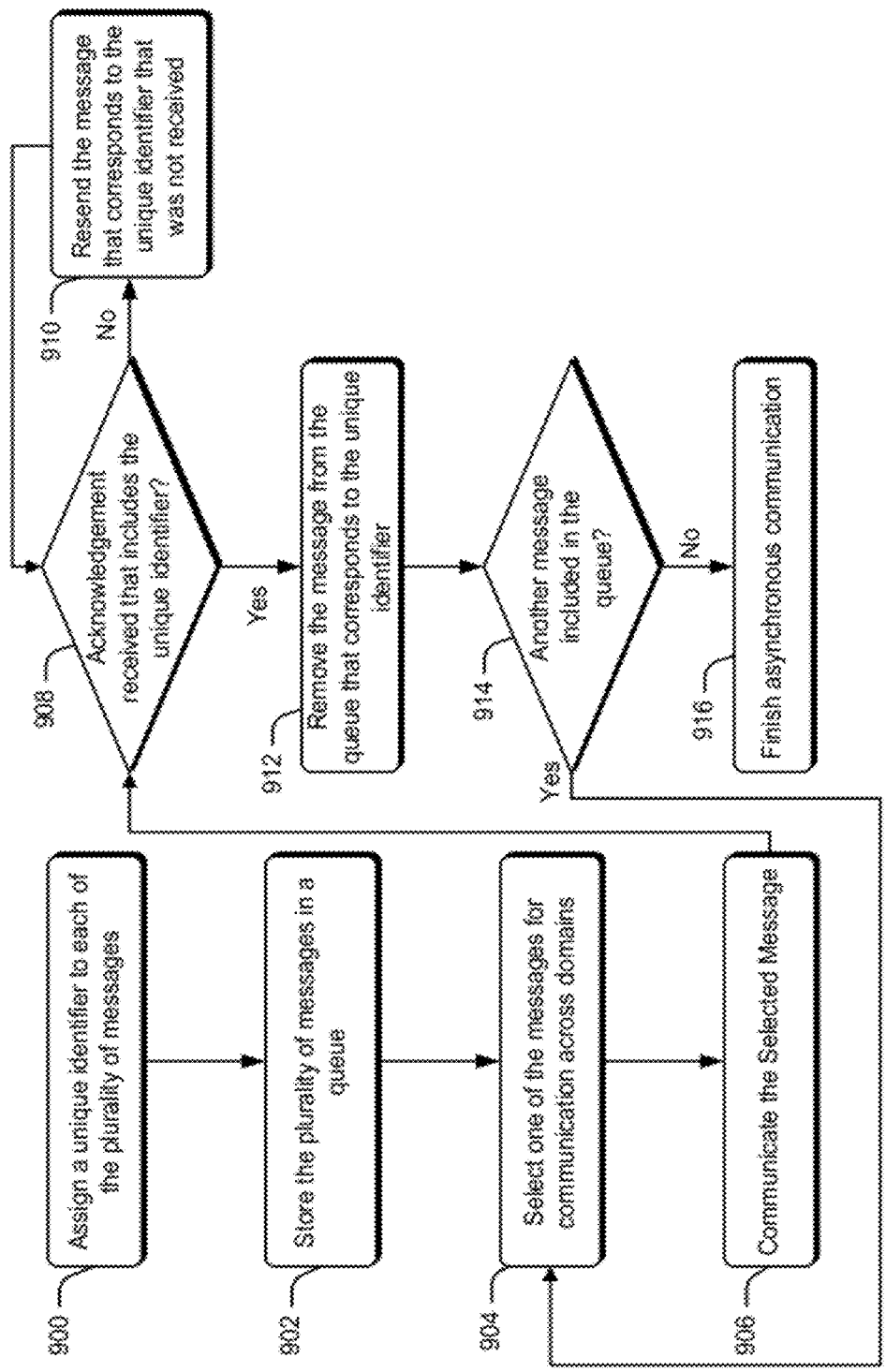
FIG. 9 is a flow diagram that describes a process for asynchronous cross domain communication.

FIG. 9 is a flow diagram that describes a process for asynchronous cross domain communication. Step 900 assigns a unique identifier to each of the plurality of messages, such as one of a plurality of messages formed via the steps of FIG. 8. The unique identifier may be assigned in a variety of ways, such as sequentially through use of a counter, use of a globally unique identifier (GUID), and so on.

Step 902 stores the plurality of messages in a queue, such as in a queue that is local to a sender of the messages. Step 904 selects one of the messages for communication across domains. For example, the queue may be configured to use first in/first out (FIFO) techniques such that the "oldest" message is first selected. A variety of other examples are also contemplated.

Step 906 communicates the selected message, such as through use of a server (e.g., as previously described in relation to FIG. 4), directly without use of a server as also previously described, and so on.

Step 908 determines whether an acknowledgement has been received that includes the unique identifier. For example, an intended recipient of the message may strip-out the unique identifier and return it in an acknowledgement to the sender to indicate that the message has been successfully received.

When the acknowledgement has not been received from step 908, step 910 resends the message that corresponds to the unique identifier that was not received. The sender, for instance, may use a "time-out" value such that when a message in the queue has not received a corresponding acknowledgement in a specified amount of time, the message is resent. A variety of other examples are also contemplated to determine when to resend a message, such as by receiving an acknowledgement of a later received message.

When the acknowledgement has been received from step 908, step 912 removes the message from the queue that corresponds to the unique identifier. In this way, the sender may "clean out" the queue or messages that have been successfully communicated yet messages that have not been successfully communicated may remain to be resent.

Step 914 determines whether another message is included in the queue. If so, step 904 selects one of the messages for communication across domains as previously described. If not, step 916 finishes asynchronous communication.

Cross Domain Communication Security Techniques

There are some instances in which it is describable to employ security techniques when enabling communication across domains. For example, the data to be communicated across the domains may be "sensitive". In such an example, techniques may be employed in which a user confirms that communication of the data is permitted before the communication occurs, further discussion of which may be found in relation to FIG. 10. In another example, a secure communication channel may be formed, such as between a sender and a third party to protect against attacks by malicious parties, further discussion of which may be found in relation to FIG. 11.

Figure 10:
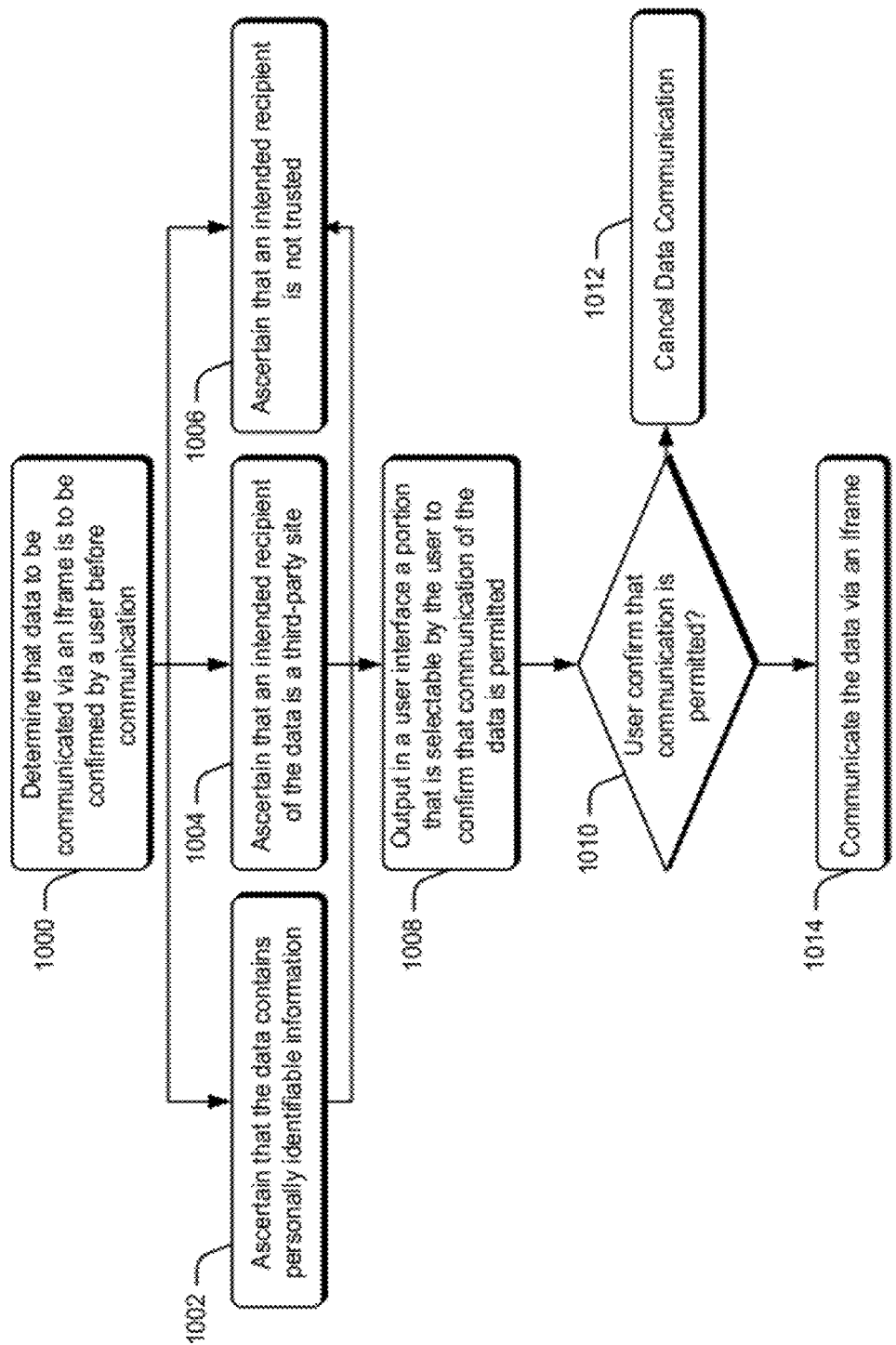
FIG. 10 is a flow diagram that describes a process for user confirmation of cross domain communication.

FIG. 10 is a flow diagram that describes a process for user confirmation of cross domain communication. Step 1000 determines that data to be communicated via an Iframe is to be confirmed by a user before communication. This determination may be made in a variety of ways. For example, step 1002 ascertains that the data contains personally identifiable information, such as through examination of the data, ascertaining that the data originated from a source containing personally identifiable information (e.g., logon information repository) and so on. In another example, step 1004 ascertains that an intended recipient of the data is a third-party site, such as a site that is not within the control and/or part of a recognized association with a sender. In a further example, step 1006 ascertains that an intended recipient is not trusted, such as by not receiving a certificate indicating trustworthiness, inclusion on an "unsafe" list and/or not included on a "safe" list, and so on. A variety of other examples are also contemplated.

Step 1008 outputs in a user interface a portion that is selectable by the user to confirm that communication of the data is permitted. The user interface, for instance, may be a web browser that outputs a pop-up window having a description of the data that is to be sent and one or more portions that are selectable by a user to confirm and/or cancel communication of the data.

Step 1010 determines whether the user confirmed that communication is permitted. If not ("no" from step 1010), step 1012 cancels data communication. If so ("yes" from step 1010), step 1014 communicates the data via an Iframe.

FIG. 11 is a flow diagram that describes a process for secure cross domain communication. Step 1100 determines that a secure communication channel across domains is warranted. For example, it may be determined that the secure communication channel is to be used to communicate sensitive data, such as personally identifiable information, banking information, and so on.

Step 1102 shares one or more secrets across the domains. For example, step 1104 provides a first secret configured as a cryptographic number from a sender to a recipient. The cryptographic number may be configured as a number that is difficult to guess based on previously generated numbers, such as a random number.

Step 1106 receives a result of a function applied to the first secret and a second secret configured as a cryptographic number from the recipient. The recipient, for instance, may also generate a cryptographic number. A function may then be applied to the cryptographic number generated by the sender and the cryptographic number generated by the recipient, which may be a function that is known or unknown by the sender.

Step 1108 forms a secure communication channel across the domains via at least one Iframe using the one or more secrets. The one or more secrets may be used as a part of the message communicated between the sender and recipient such that the sender and recipient may determine that the message originated from one of the two participants, as opposed to a malicious party. For instance, the result of the function applied to the first and second secrets may be used within a body of the message such that the sender and/or the recipient may parse the message to locate the result. A variety of other examples are also contemplated.

CONCLUSION

Various embodiments utilize nested Iframes within a web page to allow cross domain communication. That is, various embodiments can create an embedded Iframe that shares the domain of an Iframe or web page with which communication is desired. Because the embedded Iframe shares the domain of the Iframe or web page with which communication is desired, restrictions on cross-site scripting do not inhibit communication or scripting between the domain-matched Iframe(s) and/or web page. This embedded Iframe can then provide a mechanism by which web pages or Iframes from other domains can communicate with the Iframe or web page with which the embedded Iframe shares a domain.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A computing device comprising:
a computer-readable storage device comprising instructions that are executable by the computing device to:
receive a first secret to enable communication of data with a sender across domains via an Iframe, the receipt of the first secret indicating that the computing device is determined to be untrusted by the sender as confirmed by a user of the sender;
apply a function to the first secret and a second secret provided by the computing device;
send a result of the function to the sender from the computing device; and
receive the data from the sender via a secure communication channel formed across the domains via the Iframe using the result and the second secret.

2. A computing device as described in claim 1, wherein receipt of the first secret further indicates that the computing device is determined to be associated with a third-party site relative to the sender.

3. A computing device as described in claim 1, wherein the first secret received by the computing device is configured as a cryptographic number from the sender and the second secret is configured as a cryptographic number.

4. A computing device as described in claim 3, wherein the cryptographic numbers are random numbers.

5. A computing device as described in claim 1, wherein the data received by the computing device is received via a server.

6. A computing device as described in claim 1, wherein the data received by the computing device is received directly from the sender without use of a server.

7. A computing device as described in claim 1, wherein the function applied to the first secret and the second secret is known by the sender.

8. A computing device as described in claim 1, wherein the function applied to the first secret and the second secret is unknown by the sender.

9. A computing device as described in claim 1, wherein the data received by the computing device is received in a message that includes the result of the function applied to the first secret and the second secret, inclusion of the result in the message indicating that the message originated from the sender.

10. A computing device as described in claim 1, wherein the data received by the computing device is received in a message that includes the result of the function applied to the first secret and the second secret, the message including the result of the function within a body of the message.

11. A computing device as described in claim 10, wherein the instructions are further executable by the computing device to parse the message to locate the result.

12. A method comprising:
receiving a first secret by a recipient, using a computing device, to enable communication of data with a sender across domains via an Iframe, the receiving of the first secret indicating that the recipient is determined to be untrusted by the sender and is associated with a third-party site relative to the sender as confirmed by a user of the sender;
applying a function by the recipient to the first secret and a second secret provided by the recipient;
sending a result of the function to the sender by the recipient;
receiving the data by the recipient as a plurality of messages via a secure communication channel formed across the domains via the Iframe using the result and the second secret.

13. A method as described in claim 12, wherein each of the plurality of messages includes the result of the function applied to the first secret and the second secret within a body of said message.

14. A method as described in claim 12, further comprising parsing each of the plurality of messages to locate the result of the function applied to the first secret and the second secret contained in a body of each said message.

15. A method as described in claim 12, further comprising sending notifications to the sender indicating that the plurality of messages are received, the notifications including the result of the function applied to the first secret and the second secret and being parsable by the recipient to locate the result.

16. A method as described in claim 12, wherein the Iframe is incorporated within a web-page.

17. A method as described in claim 12, wherein the communication is enabled between an Iframe of the sender and an Iframe of the recipient.

18. A method as described in claim 12, wherein the data exceeds a threshold amount of data permitted for a single message.

19. A method as described in claim 12, wherein each of the plurality of messages includes a portion of the data that does not exceed a threshold amount of data permitted for a single said message.

20. A computer-readable storage device comprising instructions that are executable by a computing device to:
receive a first secret to enable communication of data with a sender across domains via an Iframe, the receipt of the first secret indicating that the computing device is determined to be untrusted by the sender as confirmed by a user of the sender;
apply a function to the first secret and a second secret provided by the computing device;
send a result of the function to the sender from the computing device; and
receive the data from the sender via a secure communication channel formed across the domains via the Iframe using the result and the second secret.

* * * * *